US011558711B2

(12) United States Patent
Palos et al.

(10) Patent No.: US 11,558,711 B2
(45) Date of Patent: Jan. 17, 2023

(54) PRECISION 6-DOF TRACKING FOR WEARABLE DEVICES

(71) Applicant: Google LLC, Mountain View, CA (US)

(72) Inventors: Xavier Benavides Palos, San Francisco, CA (US); Steven Soon Leong Toh, Alameda, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/249,421

(22) Filed: Mar. 2, 2021

(65) Prior Publication Data
US 2022/0295223 A1 Sep. 15, 2022

(51) Int. Cl.
H04W 4/024 (2018.01)
H04W 4/02 (2018.01)
(Continued)

(52) U.S. Cl.
CPC ........ *H04W 4/024* (2018.02); *G02B 27/0101* (2013.01); *G02B 27/017* (2013.01);
(Continued)

(58) Field of Classification Search
CPC ..... H04W 4/024; H04W 4/026; H04W 4/029; H04W 4/80; G02B 27/0101;
(Continued)

(56) References Cited

U.S. PATENT DOCUMENTS

2015/0070274 A1* 3/2015 Morozov ............. G02B 27/017
345/156
2016/0267712 A1* 9/2016 Nartker ................. G06T 19/006
(Continued)

FOREIGN PATENT DOCUMENTS

CA 3049379 A1 * 7/2018 ......... G02B 27/0093
WO 2020129029 A2 6/2020

OTHER PUBLICATIONS

"See altitude and coordinates", Google Earth Help, retrieved on Feb. 18, 2021 from https://support.google.com/earth/answer/7420934?co=GENIE.Platform%3DDesktop&hl=en, 1 page.
(Continued)

*Primary Examiner* — Hirdepal Singh
(74) *Attorney, Agent, or Firm* — Brake Hughes Bellermann LLP

(57) ABSTRACT

Systems and methods are described for triggering, by a wearable computing device communicably coupled to an electronic device, a location-based request, receiving location data corresponding to a location of the electronic device, receiving altitude data corresponding to an altitude of the electronic device, detecting an initial orientation for the wearable computing device based on information from at least one sensor of the wearable computing device, generating, based on the initial orientation of the wearable computing device and location data of the electronic device, a real-world orientation for the wearable computing device, (Continued)

initiating tracking of the wearable computing device in response to receiving updated location data for the electronic device, and performing the location-based request based on the tracking.

24 Claims, 12 Drawing Sheets

(51) Int. Cl.
| | |
|---|---|
| *H04W 4/029* | (2018.01) |
| *H04W 4/80* | (2018.01) |
| *G02B 27/01* | (2006.01) |
| *G06F 3/0346* | (2013.01) |
| *G06F 3/01* | (2006.01) |
| *G06F 1/16* | (2006.01) |

(52) U.S. Cl.
CPC .............. *G06F 1/163* (2013.01); *G06F 3/011* (2013.01); *G06F 3/0346* (2013.01); *H04W 4/026* (2013.01); *H04W 4/029* (2018.02); *H04W 4/80* (2018.02); *G02B 2027/0138* (2013.01); *G02B 2027/0178* (2013.01)

(58) Field of Classification Search
CPC .......... G02B 27/017; G02B 2027/0138; G02B 2027/0178; G06F 1/163; G06F 3/011; G06F 3/0346
USPC ........................................................ 340/910
See application file for complete search history.

(56) References Cited

U.S. PATENT DOCUMENTS

| | | | |
|---|---|---|---|
| 2019/0046873 A1* | 2/2019 | Black | H04L 67/38 |
| 2019/0235641 A1* | 8/2019 | Goldberg | G06F 3/013 |
| 2020/0233502 A1 | 7/2020 | Goldberg et al. | |
| 2022/0005281 A1* | 1/2022 | Skidmore | G06T 19/006 |

OTHER PUBLICATIONS

Reinhardt, "Using Global Localization to Improve Navigation", Google AI Blog, Feb. 11, 2019, 5 pages.

* cited by examiner

PRECISION 6-DOF TRACKING FOR WEARABLE DEVICES

TECHNICAL FIELD

This description generally relates to orienting and tracking a wearable device.

BACKGROUND

Computing devices (e.g., mobile devices, wearable devices, AR glasses, etc.) are often relatively compact devices. However, battery requirements and computer processing requirements for processing sensor data (e.g., image data, audio data) can be relatively high especially for devices that include display and perception capabilities. For example, a device may perform energy intensive and/or computationally intensive operations (e.g., audio and/or image processing, computer vision, etc.) that use a number of circuit components, which can cause several challenges. Further, the energy intensive operations (in conjunction with the limitations on battery capacity) can cause the battery life span to be relatively short.

SUMMARY

The systems and methods described herein may be used to share resources from a first electronic (e.g., computing) device with a second, wearable (e.g., electronic, computing) device. For example, such a wearable device (e.g., Augmented Reality (AR) glasses, a smart watch, smart glasses, earbuds/headphones, smart earbuds/headphones, or other wearable device having electronic and optical capabilities) may utilize sensors, tracking, processing, services, power, and/or other resources available on the first electronic device (e.g., a mobile device) in order to track movements of the wearable device (e.g., AR glasses). The resources of the mobile device may be used to generate and provide, for example, navigation instructions and experiences, maps, travel tips, and/or location-based discovery information to a user accessing (e.g., wearing) the wearable device (e.g., AR glasses). In particular, because wearable devices are often configured to function with a mobile device, particular operations and functions may be offloaded from the wearable device for performance on the mobile device. This configuration may ensure that the wearable device can perform complex tasks without the detriment of battery drainage or the expense of duplicating tracking and/or navigation hardware on both the wearable device and the mobile device.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, systems, methods, and computer-readable mediums are described for triggering, by a wearable computing device communicably coupled to an electronic device, a location-based request, receiving location data corresponding to a location of the electronic device, receiving altitude data corresponding to an altitude of the electronic device, detecting an initial orientation for the wearable computing device based on information from at least one sensor of the wearable computing device, generating, based on the initial orientation of the wearable computing device and location data of the electronic device, a real-world orientation for the wearable computing device, initiating tracking of the wearable computing device with six degrees of freedom in response to receiving updated location data for the electronic device, and performing the location-based request based on the tracking. The tracking of the wearable computing device may be based on the updated location data and on detected changes in the information from the at least one sensor.

Implementations may include one or more of the following features. In some implementations, the location-based request includes a request for generating navigation instructions to a destination, and the described methods, systems, and compute-readable mediums may further generate the navigation instructions based on the location data, the updated location data, the altitude data, and the generated real-world orientation. The navigation instructions may be configured to provide real time directions, according to the tracking, to navigate the wearable computing device to the destination.

In some implementations, the navigation instructions include augmented reality content depicted as direction indicators to assist a user to navigate to the destination. The direction indicators may be depicted in a near eye display device of the wearable computing device and the direction indicators may be updated according to the tracking. In some implementations, the navigation instructions include audio data and visual augmented reality content for display on a near eye display device of the wearable computing device.

In some implementations, receiving the updated location data triggers continuous tracking of the wearable computing device with six degrees of freedom as the wearable computing device is moved. In some implementations, the wearable computing device is electronic eyeglasses configured with a near eye display device to present augmented reality information and the electronic device is a smart phone configured to obtain the location data and the updated location data to be provided to the wearable computing device to assist with tracking movements of the wearable computing device.

In some implementations, the location data includes latitude and longitude position data corresponding to the location of the electronic device, the latitude and longitude position data is obtained from at least one device installed in the electronic device and the altitude data is obtained from at least one application programming interface accessed by the electronic device.

In some implementations, the initial orientation is detected by the at least one sensor where the at least one sensor is an inertial measurement unit sensor installed in the wearable computing device and the real-world orientation is generated based at least in part on data retrieved from a visual position service accessed by the electronic device.

In some implementations, the communicable coupling of the wearable computing device to the electronic device is triggered based on the triggered location-based request and based on receiving, at the wearable computing device and from the electronic device, an invitation to communicably couple over a wireless connection.

In a second general aspect, systems, methods, and computer-readable mediums are described for receiving, at a wearable computing device, a prompt to move an electronic device within a line of sight of an image sensor of the wearable computing device. In response to detecting that a visual code displayed on the electronic device is within the line of sight of the image sensor of the wearable computing device, the described systems, methods, and computer-readable mediums can scan the visual code with the image sensor where the scanning results in retrieving at least data representing an orientation of the electronic device in three-dimensional space. In some implementations, the systems, methods, and computer-readable mediums can include determining, an alignment angle in which the scanning of the visual code occurred, generate, for the wearable computing device, an initial orientation based on the orientation data of the electronic device and the determined alignment angle, and track, based on the generated initial orientation, changes in orientation of the wearable computing device as the wearable computing device moves in the three-dimensional space.

Implementations may include one or more of the following features. In some implementations, the wearable computing device is electronic eyeglasses and the electronic device is a smart phone configured to assist with tracking movements of the wearable computing device. In some implementations, the alignment angle represents a heading direction and tilt from a perpendicular to the electronic device display, at which the visual code, presented on the electronic device, is scanned by the image sensor of the wearable computing device.

In some implementations, the scanning of the visual code additionally results in obtaining, by the wearable computing device, data representing an initial position of the electronic device in three-dimensional space. In some implementations, the tracking is further based on the changes in orientation of the wearable computing device and updated positions of the electronic device received at the wearable computing device where the received updated positions result in triggering continuous tracking of the wearable computing device with six degrees of freedom as the wearable computing device is moved in the three-dimensional space.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
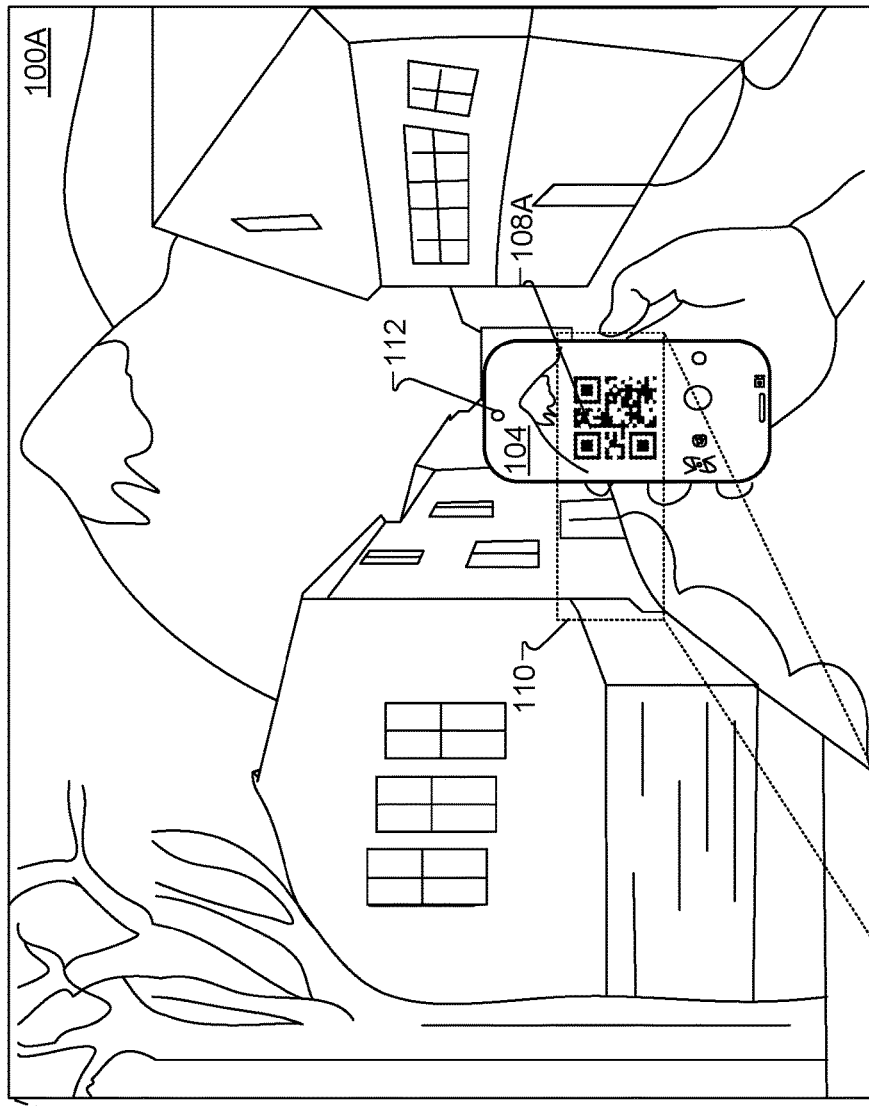
FIGS. 1A-1C illustrate examples of orienting and tracking wearable devices, according to implementations described throughout this disclosure.
Figure 1A:
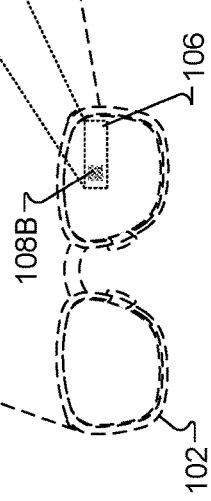

This document describes examples related to orienting and tracking for electronic wearable devices. The orientation and tracking processes may include the use of mobile phone device sensors configured to function with one or more wearable devices in order to assess an environment surrounding such wearable devices. In some implementations, the systems and techniques described herein may be configured to synchronize an orientation of a wearable device to the orientation, position, and/or location of one or more other electronic devices within a particular environment. The synchronization may enable the wearable device to access data from the other electronic devices in order to orient, track, and/or otherwise configure the wearable device to access additional services, sensors, and/or other information that is not configured onboard the software and hardware of the wearable device.

For example, a mobile device may be used as a basis in which to orient a wearable device in a physical environment using data that the wearable device receives (e.g., obtains) from the mobile device. In particular, the wearable device may be configured with a camera or scanner to capture (e.g., scan, read) a machine-readable visual code. A machine-readable visual code may include, but is not limited to a marker, a barcode, a quick response (QR) code, and other such visual codes, that may store and/or provide access to information in a machine-readable optical form. The information, or data, stored in and/or accessible via a machine-readable visual code may encompass a broad spectrum of data, including, for example, one or more strings of text, contact information, location data, image data, redirection instructions to a website, etc.

In some implementations, the mobile device sensors of electronic devices described herein may function with one or more sensors or systems of the wearable devices described herein. For example, the mobile device sensors may be used to ascertain and/or generate location data, navigation data, and/or orientation data for the mobile device. The mobile device may provide such data to the wearable device. For example, data obtained using the mobile device sensors may be provided (e.g., transmitted, communicated) to the wearable device for use in tasks performed (e.g., carried out) on the wearable device.

In some implementations, wearable devices may be designed with limited compute capabilities and/or limited sensory capabilities due to hardware cost, space limitations, and/or battery constraints. Because of such constraints, performing six degrees of freedom (6-DoF) positional tracking may be difficult without additional information. However, a user may wish to use a wearable device to conveniently access data about location and/or navigation information. The systems and methods described herein may function to enable such a wearable device to utilize capabilities of other electronic devices with communicable access to the wearable device in order to gain access to the location and/or navigation information. For example, the systems and methods described herein may configure a wearable device to access other electronic devices for purposes of computing, tracking, and/or orienting the wearable device.

Accessing such other electronic devices may include accessing, connecting to, or otherwise communicably coupling to another device owned by the same owner of the wearable device. For example, the wearable device owned by (e.g., having an account of) a first user may attempt to access another device (e.g., a mobile device, another wearable device, a computing device, an assistant device, etc.) owned by (e.g., having an account of) the first user to receive (e.g., obtain) data that may assist the wearable device in orienting, locating, and/or tracking itself within an environment.

In one non-limiting example, the wearable device may be an Augmented Reality (AR) wearable device connected via Wi-Fi or Bluetooth, low-power Bluetooth, Zigbee, or other type of short range connection to a mobile device located proximate to the wearable device. Upon connection to the mobile device, the techniques described herein may share data with the wearable device, for example, to access a visual positional system of the mobile device for location-based and tracking-based tasks.

Using the accessed mobile device data, the wearable device can determine its own orientation, location, and/or tracking data. In some implementations, the wearable device may access sensors, app data, tracking data, map data, or other mobile device data to determine particular orientation data, location data, tracking data, and navigation position data (e.g., orientation data) of the wearable device. The determined data may then be used to provide services such as navigation instructions, directions, navigation experiences, and the like. In addition, the obtained information may be used by the wearable device to generate and provide AR content, images, or other visual and/or audio content in a user interface of the wearable device.

Conventional systems typically do not have a mechanism with which to share sensor data for purposes of orienting devices with respect to other devices or orienting devices with respect to the world space (i.e., a physical environment). Similarly, conventional systems also do not have a mechanism with which to share sensor data for purposes of tracking one or more devices in order to provide location accurate services such as navigation instructions, directions to destinations, maps, location-based discovery information, and the like. Instead, conventional wearable device systems may simply not provide accurate location data, tracking data, and/or position (e.g., orientation) data.

The systems and methods described herein may perform techniques with which to synchronize a wearable device with one or more other devices. For example, a mobile device may be synchronized to a wearable device via optically captured data, wirelessly communicated data, or other configurable connection between devices. The synchronization may orient (e.g., generate a related orientation between) two or more devices based on a determined location of the mobile device that is provided to the wearable device. In some implementations, the synchronization may be based on a calculation between an alignment of the mobile device with respect to an alignment of the wearable device such that the wearable device may utilize the angle of alignment of the mobile device based on viewing content in a display of the mobile device where the viewed content is captured by a camera onboard the wearable device. Such alignments may be used to generate initial position and/or orientation calculations that may be utilized upon no longer viewing the mobile device. Additional orientations and/or positions may be calculated by the wearable device (e.g., via sensors of the wearable device) based on the initial position generated using the sensors of the mobile device.

Such techniques may provide an advantage to a device owner of saving device cost, battery life, and processing power by enabling a robust set of sensors on a first device (e.g., the mobile device) to be used with a less robust set of sensors on the second device (e.g., the wearable device) to provide both devices with the same (or similar) functionality.

In some implementations, the wearable devices described herein may leverage data from other devices in an environment in order to access services for the wearable device. For example, tracking and navigation services can be accessed through a mobile device and by a wearable device without having to subscribe to service costs on both devices.

The techniques described herein provide an advantage of reserving battery power on a wearable device by using compute resources, sensors, and data from one or more other electronic devices to determine location and orientation data for the wearable device. Such techniques may ensure that the wearable devices need not utilize cellular service, location, or GPS services, and the like, which can quickly drain a wearable device battery. Instead, the techniques described herein may utilize compute resources, sensors, and/or other data from the one or more electronic devices within a particular environment in order to enable the wearable device to determine tracking and location data and continue to track changes in such data as the user moves with the wearable device within a particular environment (e.g., outdoor, indoor, AR environment, VR environment, etc.).

The systems and methods described herein may solve the technical challenge (e.g., technical problem) of determining a position and/or orientation (e.g., a pose) of a wearable device. A system is needed to offboard processing power from the wearable device to reduce processing overhead and to conserve battery resources while still providing tracking and navigation functionality on the wearable device. The systems and methods described herein provide a technical solution to the technical problem by configuring the wearable device to communicate with (e.g., communicate, synchronize, or otherwise access) sensors, processors, and other resources from other electronic devices configured with tracking functionality and navigation functionality.

The technical solutions described herein may provide a technical effect of reducing battery drain on the wearable device as a number of location-based calculations and services may be accessed by an alternative electronic device and later provided to the wearable device for use. The technical solutions described herein may also provide a technical effect of enhanced sharing of sensor use across devices connected over a wireless network. For example, the wearable devices described herein may be communicably coupled to any number of other electronic devices to utilize data captured from sensors onboard the other electronic devices. Such sharing of data enables the wearable device to be less burdened by location and tracking tasks, which may allow for other processing activities to be executed without impacting the performance of the wearable device. The technical solutions described herein may also provide a technical effect of enhanced compute power by utilizing one or more electronic computing devices communicably coupled to the wearable devices described herein.

FIG. 1A illustrates an example of orienting and tracking wearable devices, according to implementations described throughout this disclosure. In this example, users may enter a physical space, such as environment 100A, and may carry one or more computing devices. For example, a user may be wearing a wearable device 102 (i.e., AR eyeglasses) and may have a mobile device 104 within range of the wearable device 102. The wearable device 102 may be communicably coupled (e.g., synchronized, wirelessly connected, wire connected, etc.) to mobile device 104. The communicable coupling can enable the mobile device 104 and the wearable device 102 to share information in order to complete tasks. For example, the mobile device 104 may share tracking information, navigation data, location data, and/or other data gained by sensors on device 104 such that wearable device 102 can utilize the data to carry out navigation tasks, direction tasks, and the like.

In operation, a user may be wearing wearable device 102 and viewing an outdoor environment 100A. The outdoor environment 100A represents a physical environment that is viewable with and without wearing the wearable device 102. The environment 100A is shown with cut off portions in a rectangular shape out of ease of showing an outdoor scene and not based on generated screen content because wearable device 102 is a pair of eyeglasses with electronics for viewing augmented and/or virtual content via display 106.

A user (shown holding mobile device 104) may view the environment 100A including the device 104 when held in a line of sight of the user The wearable device 102 may view, with an onboard camera (not shown in FIG. 1A), the environment 100A and the mobile device 104 when the device 104 is held in a line of sight of the user. In this example, the wearable device 102 includes a display 106 which may depict content captured by the onboard camera (not shown in FIG. 1A) of the wearable device 102. Here, the content includes visual code (e.g., a QR code 108A) captured from mobile device 104 and depicted in display 106 as QR code 108B. The content may also include other portions of environment 100A captured by the onboard camera of wearable device 102, as shown in capture area 110.

The QR code 108A may be generated by mobile device 104 based on a determined location of the mobile device using camera 112 and/or other onboard sensors described throughout this disclosure. The determined location may include a mobile device latitude, a mobile device longitude, a mobile device altitude, and the like. In some implementations, the QR code 108A may also include user-requested destination information and/or position and orientation information. For example, a user may request directions to a particular destination using mobile device 104. The request may be entered in the screen of device 104 or verbally requested of device 104. In some implementations, the request may be requested verbally at the wearable device 102 and may be transferred to mobile device 104, based on the communicable coupling of device 102 and device 104, for example.

Regardless of the origination of the directions request, the mobile device 104 may generate a visual code (e.g., QR code 108A) that includes a requested destination name, a determined destination latitude, a determined destination latitude, a determined destination longitude, and a determined destination altitude in addition to the mobile device latitude, longitude, and altitude. In some implementations, the visual code (e.g., QR code 108A) may also include alignment information describing an orientation of the wearable device 102 with respect to the mobile device 104. The wearable device 102 may use an onboard camera to read the visual code (e.g., QR code 108A) in order to obtain information about how to navigate to the destination based on determined positions and/or orientations for one or both devices 102 and/or 104.

Generating QR code 108A may include generating storable patterns that uniquely define the data represented by the visual code (e.g., QR code 108A). For example, in some situations, the visual codes may include black and white patterns, defined, for example, by black lines, or bars, or dots, or other shapes, and white spaces, contained within the boundaries of the machine-readable visual code. The patterns defining visual codes may alternatively be represented by colors other than black and white, and/or combinations of colors, any of which may be incorporated in the pattern of the visual code to uniquely define the data associated with the visual code.

Visual codes as described above may be read by a variety of different kinds of electronic devices, or computing devices, that have optical scanning capability. For example, in some implementations, visual codes may be read by handheld devices (such as, for example, smart phones, handheld controllers, and the like) having optical scanning capability, optical sensor and/or cameras. In some implementations, visual codes may be read by wearable devices (such as, for example, AR glasses, smart watches, earbuds/headphones, smart earbuds/headphones, and the like) having optical capabilities, optical sensors, and/or cameras.

Figure 1B:
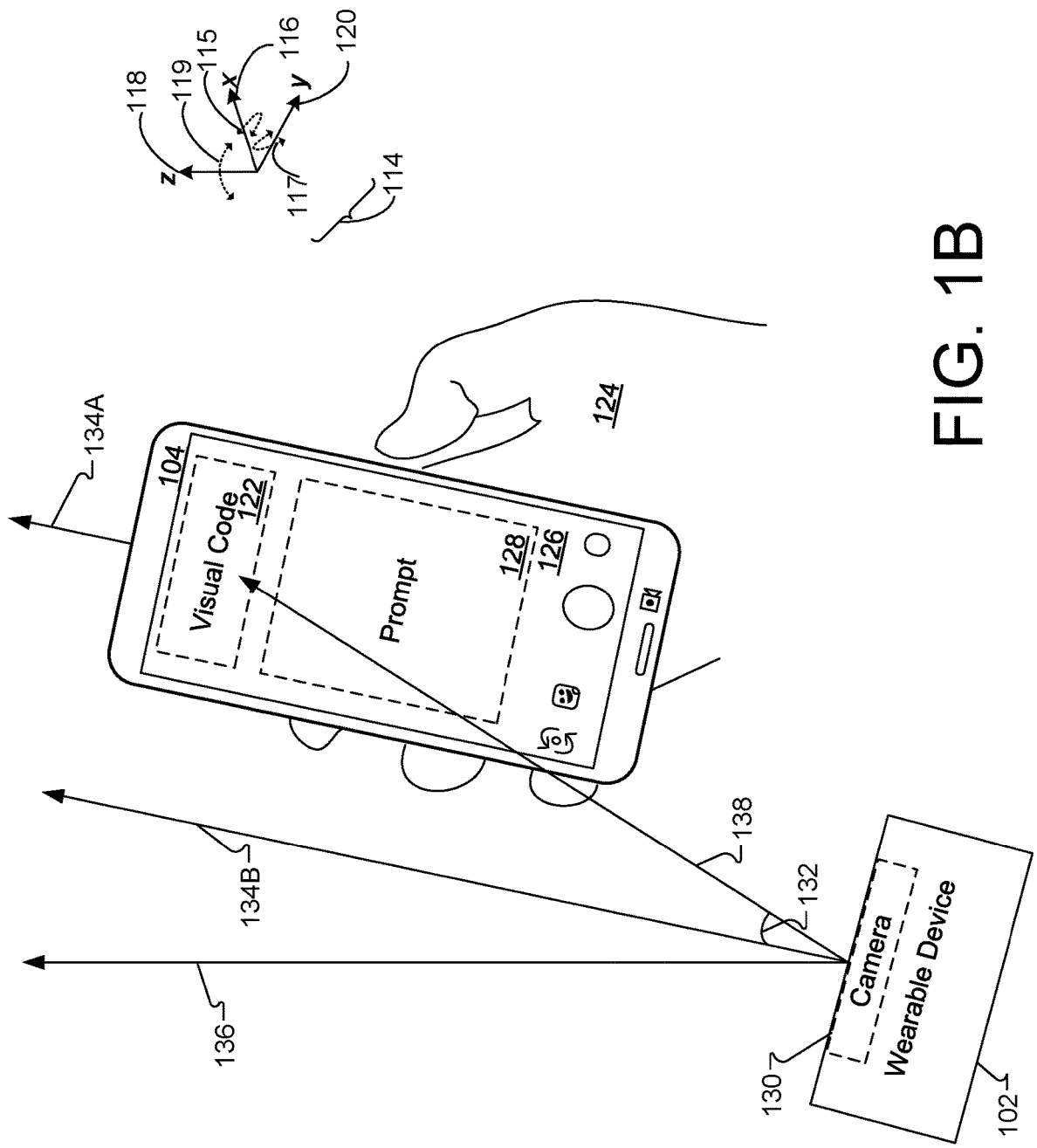

FIG. 1B illustrates an example of synchronizing and orienting the wearable device 102 with respect to the mobile device 104. For example, the systems and methods described herein may determine an orientation associated with the wearable device 102 by using a detected orientation of the mobile device 104.

In general, the orientations, positions, and/or locations of the devices described herein (e.g., mobile device 104, wearable device 102) may be generated based on a frame of reference 114 in the world (e.g., physical environment). The frame of reference 114 of a device is not fixed in space, but rather has an orientation that tracks the orientation (or pose, position, or location) of the device, as the device moves in space (e.g., a physical environment, a real-world space). The frame of reference 114 may be defined by at least three orthogonal axes. For example, the frame of reference 114 may be defined by a first axis 116 that may be, for example, parallel to a horizontal direction of the device, a second axis 118 that may be, for example, parallel to a vertical direction of the device, and a third axis 120 that is orthogonal to the first and second axes.

In some implementations, the frame of reference 114 may also be described in degrees of freedom that represent a number of axes in which an object or device moves freely in three-dimensional space. For example, the frame of reference 114 may refer to a number of translations and rotations where translations represent positions on the x, y, and z-axes. The translations may represent positions on the axes. For example, the positions may correspond with forward motion and/or backward motion on the x-axis (e.g., surge). The positions may also correspond with leftward motion and/or rightward motion on the y-axis (e.g., heave). The positions may also correspond with upward motion and/or downward motion on the z-axis (e.g., sway). Rotations may represent orientation data. For example, rotations may include orientation data representing tilting side-to-side on the x-axis (e.g., roll), as shown by arrow 115. Rotations may also include orientation data representing tilting forward and/or backward on the y-axis (e.g., pitch), as shown by arrow 117. Rotations may also include orientation data representing turning left and/or right on the z-axis (e.g., yaw), as shown by arrow 119. In operation, the mobile device 104 may be used to determine (and/or assist in determining) positions and orientations for the wearable device 102 as either device moves in three-dimensional 3D space (e.g., the x-y-z axis shown in FIG. 1B).

In some implementations, the positions and rotations of the wearable devices described herein may represent an area of a particular field of view of image content relative to a real-world orientation (e.g., pointing direction and/or roll, pitch, and yaw, etc.) of a device (e.g., wearable device 102 and/or mobile device 104). For example, when the wearable device 102 is oriented (in the real world, for example) with zero roll, pitch, and yaw, the field of view may be centered on a forward axis of the coordinate system of a surrounding view of image content (e.g., the wearable device 102 pointing direction may be aligned with the forward axis). As the orientation of the device 102 changes (as indicated by orientation and/or motion sensors, for example), the field of view orientation may be changed in accordance with the orientation of the device.

In some implementations, the coordinate systems described herein may be GPS-based coordinate systems. In some implementations, the coordinate systems described herein may be vision-based coordinate systems that take into account visual data captured by a device. In some implementations, the coordinate systems described herein may include relative coordinate systems based on locations, visual data, and the like. Such systems may also take into account coordinate systems of other devices within a predefined range of each other in order to generate a shared coordinate system.

In some implementations, to determine a position and/or orientation of the mobile device 104, a Visual Positioning Service (VPS) configured on the mobile device 104 may obtain an accurate measurement of the orientation, position, and/or location of the mobile device 104 in the world (e.g., a physical environment). The wearable device 102 may determine its orientation in the world based on the orientation, position, and/or location determined by the VPS of the mobile device 104. For example, once the orientation (or pose, position, and/or location) of the mobile device is determined using the onboard VPS, the mobile device 104 may generate a visual code 122 (e.g., a scannable QR code) that represents the determined orientation (or pose, position, and/or location) of the mobile device 104. The visual code 122 may be modified in real time as a user 124 moves the phone in space. Modifying the visual code generates an updated orientation (or pose, position, and/or location) information that is used to visually modify the visual code 122 in real time. In general, the VPS may provide a visual code that represents orientation, position, and/or location data of the mobile device 104 where the visual code is configured to be detected and read in 6-DoF.

To begin synchronizing the orientation of the wearable device 102 to the orientation of the mobile device 104, the mobile device may generate and display the visual code 122 in the display screen 126 of the mobile device 104. In addition, the mobile device 104 may be triggered to display a prompt 128 to the user to request that the user 124 bring the wearable device 102 near to the mobile device 104 or to bring the mobile device 104 within a range of a camera 130 of the wearable device 102. The prompt may include other instructions, but generally functions to engage the user 124 to capture a view of the visual code 122 using camera 130. When the user 124 brings the mobile device 104 in view of the wearable device, the camera 130 may be used to read/scan the visual code 122 so that the wearable device 102 obtains the current orientation (or pose, position, location, and/or other information stored in the code 122) of the mobile device 104. The information, or data, stored in and/or accessible via the visual code 122 may encompass a broad spectrum of data, including, for example, one or more strings of text, contact information, location data, redirection to a website and more.

When the wearable device 102 detects and read/scans the visual code 122, an alignment angle 132 can be determined by the wearable device 102 because the wearable device reads/scans the visual code 122 from a particular angle of orientation. The alignment angle 132 defines an angle between the mobile device 104 (shown by arrow 134A representing a tilt from a vertical 136 reproduced for ease of this description by arrow 134B, which is parallel to arrow 134A) and the wearable device 102 (shown by arrow 138 representing a tilt from the vertical 136). In some implementations, the alignment angle 132 represents a heading direction (arrow 134B) and a tilt from a perpendicular (y-axis) to the mobile device 104 display, at which the visual code 122, presented on the device 104, is scanned by the image sensor (e.g., camera 130) of the wearable device 102.

In operation, the wearable device may read/scan the visual code 122 to obtain the world orientation of the mobile device 104. Recognizing the visual code 122 in 6-DoF enables the wearable device 102 to then determine alignment angle 132. Using the world orientation of the mobile device 104 and the alignment angle 132, the wearable device may calculate the world orientation for the wearable device 102. The world orientation of the wearable device 102 may function as an initial orientation for the device 102 which can be used to continue to track changing orientations for device 102 using an onboard IMU sensor (not shown). That is, the mobile device 104 may be removed from view and stored in a pocket or the like and the wearable device 102 may use the onboard IMU sensor to track the device 102 as the user moves in space, for example.

Figure 1C:
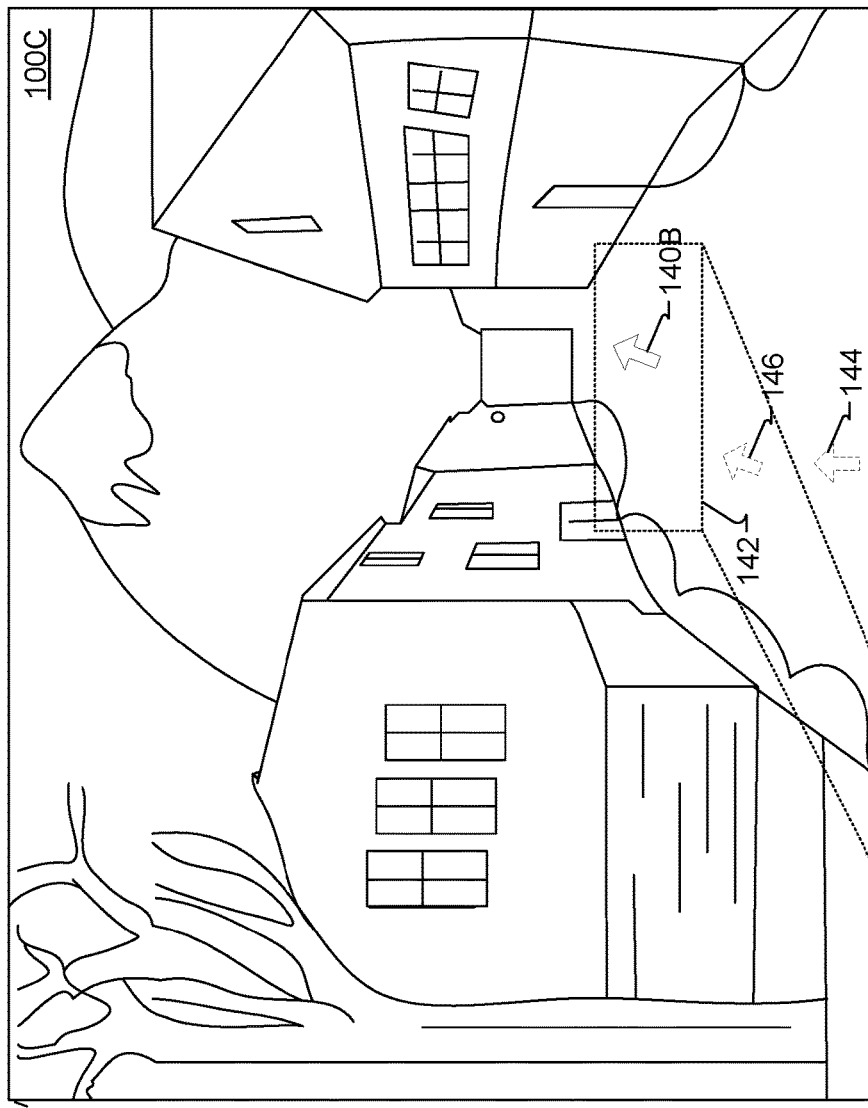
Figure 1C:
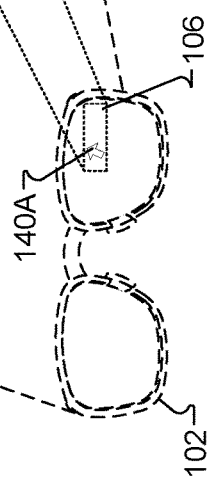

FIG. 1C is an example of determining a 6-DoF position for the wearable device 102 in order to generate a navigation experience for a user of the wearable device 102. Because wearable devices may have limited computational and sensory capabilities due to hardware and/or battery constraints, performing 6-DoF tracking may be difficult. However, 6-DoF tracking is convenient when accurate navigation capabilities are requested by an electronic device. Thus, the wearable device 102 is configured to access a communicably coupled mobile phone device (e.g., mobile device 104—FIG. 1A/1B) to obtain 6-DoF tracking while still operating in with low-power and processing consumption.

For example, the mobile device 104 and the wearable device 102 may be communicably coupled via wired or wireless connection to enable data gathered from the mobile device 104 to be provided and/or used by the wearable device 102. In some implementations, such data may include information obtained using a GPS sensor onboard mobile device 104. In some implementations, the data may include information obtained by other sensors onboard mobile device 104 including, but not limited to a visual positioning system, an image sensor, an IMU, an accelerometer, a gyroscope, a compass, or other hardware or software implemented sensor. In some implementations, application data retrieved on mobile device 104 may also be provided to wearable device 102. For example, map data, tracking data, audio data, and/or visual data may be provided to wearable device 102 to assist in one or more tasks to be carried out on wearable device 102.

In the depicted environment 100C of FIG. 1C, the user wearing device 102 may view an outdoor environment 100C, similar to outdoor environment 100A. The outdoor environment 100C is a physical environment that is viewable with and without wearing the wearable device 102. The environment 100C is shown with cut off portions in a rectangular shape out of ease of showing an outdoor scene and not based on generated screen content because wearable device 102 is a pair of eyeglasses with electronics for viewing augmented and/or virtual content via display 106. The wearable device 102 may view, with an onboard camera (not shown in FIG. 1C), the environment 100C, and may present any or all of the view on a display 106 to the user wearing device 102.

Additional content may be depicted on display 106 as well. In this example, instructional arrow 140A, which corresponds to arrow 140B in box 142 representing content shown on the device 102. In this example, the user may have requested directions to a destination. In response, the wearable device may go through the steps described below in order to generate and display directional indicators such as arrow 140A, which may appear overlaid onto environment 100C so the user may follow the indicators to the destination. In some implementations, audio indications or other instructions, maps, virtual content, etc. may also be provided to the user to assist in directing the user to the destination. In some implementations, the other instructions, maps, or virtual content may provide information about the destination. In this example, indicators 144 and 146 may have been previously and sequentially displayed to the user on display 106 and removed from view as the user walks through environment 100C wearing device 102. The arrows 144, 146, 140A, and140B are an example of a portion of a navigation experience to navigate a user to a destination location.

In operation of wearable device 102 in FIG. 1C, the user may request directions to a destination. The user may request the directions on the screen of the mobile device 104 (not shown in FIG. 1C) or via a microphone on the mobile device 104. In some implementations, the user may request the directions via a microphone (not shown) on the wearable device 102.

If the directions are requested at the mobile device 104, the mobile device may access an onboard GPS sensor to determine a latitude position and a longitude position of the mobile device 104. Since the mobile device 104 and the wearable device 102 are generally within range of one another to obtain an integrated experience, the systems and methods described herein can use the latitude position and longitude position of the mobile device 104 as the latitude position and longitude position of the wearable device 102. The latitude position and the longitude position of the mobile device 104 may be communicated to the wearable device 102 via Bluetooth, for example.

If the directions are instead requested at the wearable device 102, the wearable device 102 may communicate the request to the mobile device 104. The mobile device 104 may then determine the latitude position and longitude position of the mobile device 104 and communicate such information to the wearable device 102.

Next, a map application programming interface (API) of the mobile device 104 may be accessed to obtain a precise altitude of the mobile device 104. This altitude may represent an altitude determined using the GPS. In some implementations, the altitude may instead be obtained using the VPS of the mobile device 104, which may access an onboard camera system, vision system, and/or image sensor on the mobile device 104. The obtained altitude measurements may be communicated to the wearable device 102. The wearable device 102 utilizes the altitude measurements and the position (e.g., latitude and longitude) to figure out the position and altitude of the wearable device 102 in the world space.

To obtain an orientation of the mobile device 104 in world space, the systems and methods described herein may request the orientation measurement from the VPS of the mobile device 104. The orientation obtained from the VPS of the mobile device 104 may be communicated to the wearable device 102. The wearable device 102 may then continue to track its rotation and orientation in world space using the onboard IMU of the wearable device 102 based on the initial position and orientation obtained from (e.g., communicated from) the mobile device. In particular, the position is based on the initially received latitude and longitude positions from the GPS of the mobile device 104. The rotation and orientation is based on the initially received altitude and position from the VPS of the mobile device 104. Thus, using VPS and GPS of the mobile device 104 in combination with the IMU of the wearable device 102, the wearable device 102 may begin to track itself in 6-DoF in world space in order to provide a navigation experience with instructions, directions, and/or other visual content on display 106 of the wearable device 102.

Any number of computing systems may be included in environment 100A. Similarly, any number of wearable devices may be included in environment 100A. For example, additional wearable devices (not shown) may be worn by a first user (or another user in the environment 100A with the first user) and each additional wearable device may be configured to operate with either mobile device 104 or another configured device.

Figure 2A:
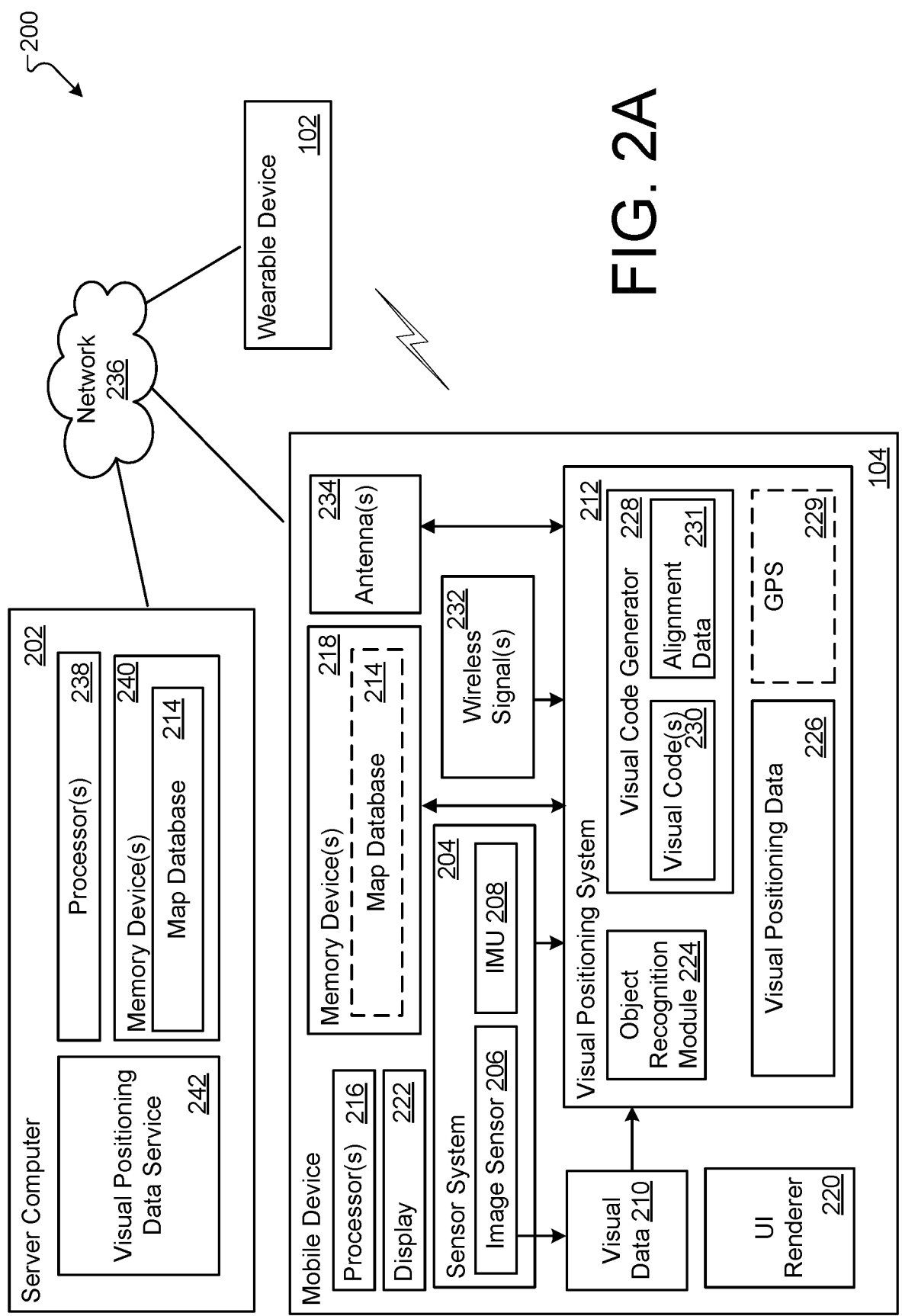
FIGS. 2A-2B illustrate block diagrams of an example system for orienting and tracking wearable devices in a physical environment and/or an Augmented Reality (AR) environment, according to implementations described throughout this disclosure.
Figure 2B:
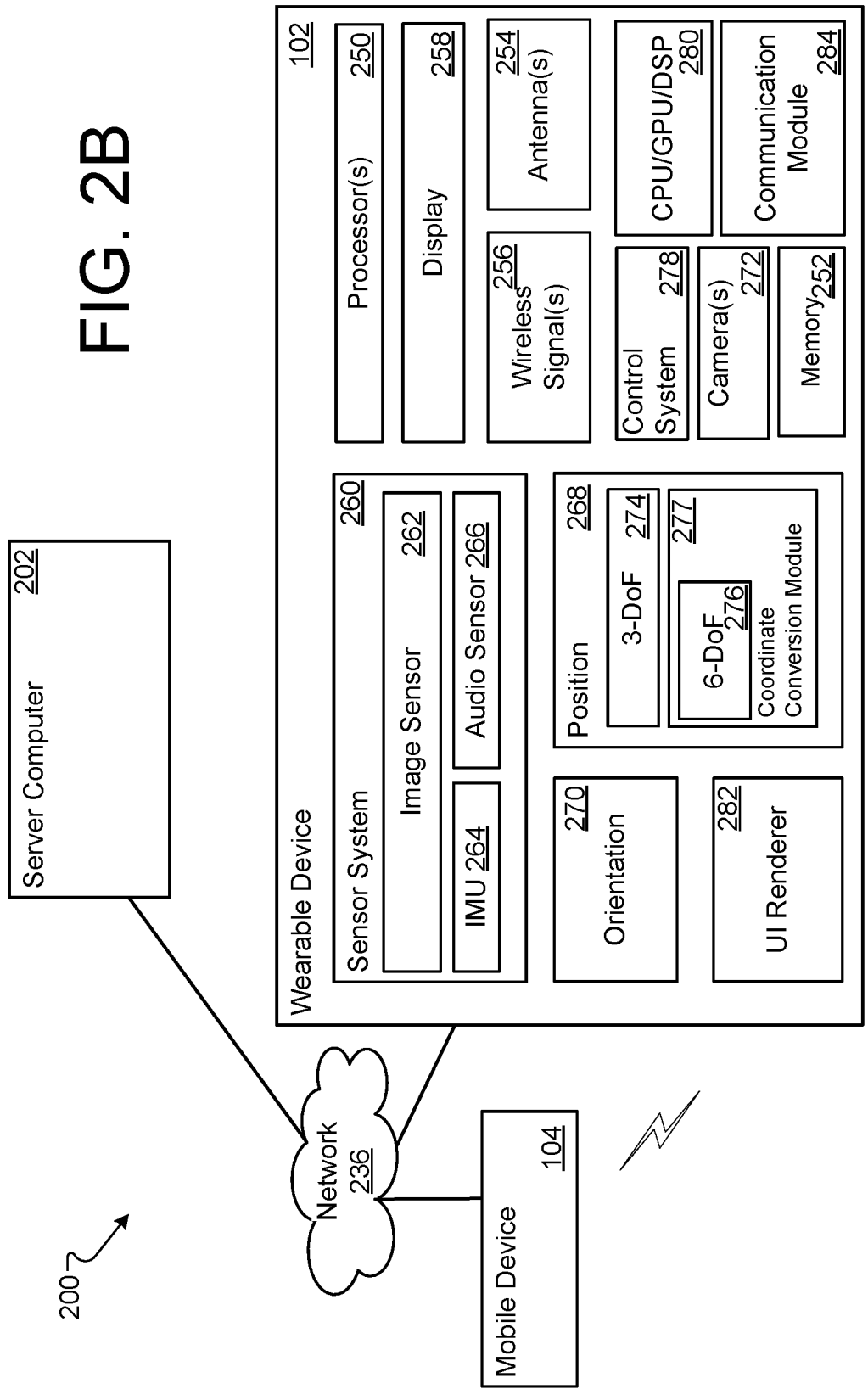

FIGS. 2A-2B illustrate block diagrams of an example system for orienting and tracking a wearable device 102 in a physical environment and/or an Augmented Reality (AR) environment, according to implementations described throughout this disclosure. In some implementations, the wearable device 102 may use the computing device (e.g., mobile device 104) and/or server computer 202 to obtain particular position, mapping, and tracking data in order to maintain orientation and tracking data of itself. For example, the wearable device 102 may include fewer sensors and tracking mechanisms than the mobile device 104 and/or server computer 202 such that device 102 can offload particular tasks to maintain battery of the wearable device and to conserve processing power of the wearable device 102, as described in various examples throughout this disclosure. In operation, the mobile device 104 may use one or more onboard sensors to obtain mobile device position data. The obtained mobile device position data may be used to generate visual codes to represent the mobile device position data. The obtaining of position data may occur continually as a user of the mobile device 104 moves the device 104 in a physical environment. The position data may be based sensor system 204 including camera image sensor 206, IMU data from IMU sensor 208, and/or visual data 210 retrieved by visual positioning system 212 via visual positioning data service 242 of server computer 202, for example. In some implementations, the position may be a 6-DoF position accessed by maps stored in map database 214, for example. In some implementations, the position of the mobile device 104 may be a three dimensional (3D) position that represents a location (and, optionally, orientation) of the mobile device 104 in a 3D physical space in which the user (and/or the computing system 104) is situated. In some examples, the position may be used to generate a 6-DoF position of the wearable device 102.

As shown in FIG. 2A, the mobile device 104 includes one or more processors 216, which may be formed in a substrate configured to execute one or more machine executable instructions or pieces of software, firmware, or a combination thereof. The processors 216 can be semiconductor-based that include semiconductor material that can perform digital logic. The mobile device 104 can also include one or more memory devices 218. The memory devices 218 may include any type of storage device that stores information in a format that can be read and/or executed by the processor(s) 216. The memory devices 218 may store applications and modules (e.g., visual position system 212, UI renderer 220, etc.) that, when executed by the processor(s) 216, perform certain operations. In some examples, the applications and modules may be stored in an external storage device and loaded into the memory devices 218.

The mobile device 104 also includes a display 222 that is projected for view by the user. The display 222 may include a liquid crystal display (LCD), a light-emitting diode (LED) display, an organic light-emitting display (OLED), an electro-phoretic display (EPD), or a micro-projection display adopting an LED light source.

The mobile device 104 also includes the sensor system 204. The sensor system 204 includes an image sensor 206. In some examples, the sensor system 204 includes multiple image sensors 206. In general, the image sensor 206 captures visual data 210, which may include image data along with depth information. In some examples, the image sensor 206 is a red green blue (RGB) camera. In some examples, the image sensor 206 includes a pulsed laser sensor (e.g., a LiDAR sensor) and/or depth camera. For example, the image sensor 206 may be a camera configured to detect and convey information used to make an image, which is represented by the visual data 210. The image sensor 206 can capture and record both images and video.

The sensor system 204 may include an inertial motion unit (IMU) 208. The IMU sensor 208 may detect motion, movement, and/or acceleration of the mobile device 104. The IMU sensor 208 may include various different types of sensors such as, for example, an accelerometer, a gyroscope, a magnetometer, and other such sensors. The sensor system 204 may include other types of sensors such as a light sensor, an audio sensor, a distance and/or proximity sensor, a contact sensor such as a capacitive sensor, a timer, a compass, and/or other sensors and/or different combination(s) of sensors.

The visual positioning system 212 includes an object recognition module 224, visual positioning data 226, and a visual code generator 228. The object recognition module 224 may include one or more image recognition algorithms, which may include one or more neural networks. In some implementations, when directing the image sensor 206 (e.g., camera) at an object (and/or location), the object recognition module 224 may be configured to identify the object (and/or location) based on visual data 210, map data from database 214, onboard sensor data, map service data (not shown), and the like. The mobile device 104 may use such determined object and/or location to generate one or more visual codes 230, which may include, but are not limited to barcodes, QR codes, labels, text, and the like. For example, the object recognition module 224 is configured to identify objects (and/or locations) in the visual data 210 and may generate identification data about the detected objects and/or locations. In some implementations, the identification data (e.g.,
corresponding to the visual data 210) is represented by visual codes 230, which may be generated by visual code generator 228. The visual codes may be continuously modified to update information in the visual code as a user moves the mobile device 104 in a physical environment. For example, as the user moves the mobile device 104 depicting a visual code on display 222, device 104 may continuously update the visual code to represent the new location of the device 104 because the device 104 is being moved to new locations in space.

The visual codes 230 may be used to select or identify which 3D maps in the map database 214 to resolve against the visual data 210. In some implementations, the visual codes 230 may include a device name, a device type, a location latitude, longitude, altitude, and/or other characteristic(s) about the device reading or presenting the visual code 230 or a surrounding environment that includes the device reading or presenting the visual code 230. In addition to generating visual codes 230, the visual code generator 228 may utilize sensor system 204 to determine alignment data 231 that represents an angle of alignment between the mobile device 104 and the wearable device 102, for example, when the mobile device 104 is visible by the wearable device 102. The alignment data 231 may be included as information within visual codes 230 generated by generator 228.

In some implementations, the visual data 210 is compared against one or more maps of database 214 to determine whether there is a match. For example, in order to determine that the one or more maps at least partially correspond to a physical space represented by the visual data 210 captured by the image sensor 206, the visual data 210 is compared against one or more maps to determine whether visual feature points in a map match other visual feature points (e.g., detected from visual data 210). If there is a match, visual positioning data from system 212 may be passed to wearable device 102 for use in future tracking and navigation tasks. In some examples, the visual positioning data includes a pose (e.g., position and orientation) of the mobile device 104. The visual positioning data may be used to compute the position of the wearable device 102 relative to the mobile device 104. In some implementations, the visual positioning data may be used in combination with information from the IMU sensor 208 to compute the position of the mobile device 104. In addition, the position of the mobile device 104 may be provided via wireless communication, for example, to the wearable device 102 to maintain tracking and position information for the wearable device 102. For example, the IMU of the wearable device may use the initial position of the mobile device 104 as a basis to track the mobile device 104.

The visual positioning system 212 may also include a Global Positioning System (GPS) 229, which may provide navigation-related and location-related wireless data for mobile device 104. The GPS 229 may obtain latitude and longitude positions of the mobile device 104 and/or latitudes and/or longitudes of destinations requested by users in navigation requests. In some implementations, the GPS 229 is not part of the visual positioning system, but instead is a standalone module on device 104.

In some examples, the mobile device 104 may receive one or more wireless signals 232 and use the wireless signals 232 to communicate with other devices such as wearable device 102 and server computer 202, or other devices within range of antennas 234. The wireless signals 232 may be triggered via a wireless connection such as a short-range connection (e.g., Bluetooth connection or near-field communication (NFC) connection) or an Internet connection (e.g., Wi-Fi or mobile network).

The mobile device 104 includes a UI renderer 220 that uses determined positions of the device 104 and/or device 102 to generate and render user interface content on the display 222 and/or to trigger generation of user interface content on the display (not shown) of wearable device 102, for example.

In some examples, the mobile device 104 is configured to communicate with the server computer 202 over a network 236. The server computer 202 may be computing devices that take the form of a number of different devices, for example a standard server, a group of such servers, or a rack server system. In some examples, the server computer 202 is a single system sharing components such as processors and memories. The network 236 may include the Internet and/or other types of data networks, such as a local area network (LAN), a wide area network (WAN), a cellular network, satellite network, or other types of data networks. The network 236 may also include any number of computing devices (e.g., computer, servers, routers, network switches, etc.) that are configured to receive and/or transmit data within network 236.

The server computer 202 includes one or more processors 238, which may be formed in a substrate configured to execute one or more machine executable instructions or pieces of software, firmware, or a combination thereof. The processor(s) 238 can be semiconductor-based, which may include semiconductor material that can perform digital logic. The server computer 202 includes one or more memory devices 240. The memory devices 240 may include a main memory that stores information in a format that can be read and/or executed by the processors 238.

In some examples, the server computer 202 is configured to execute a visual positioning data service 242 in combination with the visual position system 212. The visual positioning data service 242 may be an augmented reality (AR) collaboration service that allows users to create 3D maps (e.g., cloud anchors) for creating multiplayer or collaborative AR experiences and navigation experiences that users can share.

As shown in FIG. 2B, the system 200 illustrates additional details for the wearable device 102. In some examples, the wearable device 102 includes one or more computing devices, where at least one of the devices is a display device capable of being worn on or in proximity to the skin of a person. In some examples, the wearable device 102 is or includes one or more wearable device components. In some implementations, the wearable device may include a head-mounted display (HMD) device such as an optical head-mounted display (OHMD) device, a transparent heads-up display (HUD) device, a virtual reality (VR) device, an AR device, or other devices such as goggles or headsets having sensors, display, and computing capabilities. In some implementations, the wearable device includes AR glasses (e.g., smart glasses). AR glasses represent an optical head-mounted display device designed in the shape of a pair of eyeglasses. In some implementations, the wearable device is or includes a smart watch. In some implementations, the wearable device is or includes a piece of jewelry. In some implementations, the wearable device is or includes a ring controller device or other wearable controller. In some implementations, the wearable device is or includes earbuds/headphones or smart earbuds/headphones.

The wearable device 102 includes one or more processors 250, which may be formed in a substrate configured to execute one or more machine executable instructions or pieces of software, firmware, or a combination thereof. The processors 250 can be semiconductor-based and may include semiconductor material that can perform digital logic. Such processors 250 may include CPUs, GPUs, and/or DSPs, just to name a few examples.

The wearable device 102 can also include one or more memory devices 252. The memory devices 252 may include any type of storage device that stores information in a format that can be read and/or executed by the processor(s) 250. The memory devices 252 may store applications and modules that, when executed by the processor(s) 250, perform certain operations. In some examples, the applications and modules may be stored in an external storage device and loaded into the memory devices 252. The wearable device 102 includes one or more antennas (254) configured to communicate with other computing devices via wireless signals 256. For example, the wearable device 102 may receive one or more wireless signals 256 and use the wireless signals 256 to communicate with other devices such as mobile device 104 and server computer 202, or other devices within range of antennas 254. The wireless signals 256 may be triggered via a wireless connection such as a short-range connection (e.g., Bluetooth connection or near-field communication (NFC) connection) or an Internet connection (e.g., Wi-Fi or mobile network).

The wearable device 102 includes a display 258. The display 258 may include a liquid crystal display (LCD), a light-emitting diode (LED) display, an organic light-emitting display (OLED), an electro-phoretic display (EPD), or a micro-projection display adopting an LED light source. In some examples, the display 258 is projected onto the field of view of the user. In some examples, in the case of AR glasses, the display 258 may provide a transparent or semi-transparent display such that a user wearing the AR glasses can view images provided by the display 258 but also information located in the field of view of the AR glasses behind the projected images.

The wearable device 102 includes a sensor system 260. The sensor system 260 includes an image sensor 262 configured to obtain image data. In some examples, the sensor system 260 includes multiple image sensors 262. The image sensor 262 can capture and record images and video. The sensor system 260 may include an IMU 264. The IMU 264 may detect motion, movement, and/or acceleration of the wearable device 102. The IMU 264 may include various different types of sensors such as, for example, an accelerometer, a gyroscope, a magnetometer, and other such sensors. The sensor system 260 includes an audio sensor 266 configured to detect audio received by wearable device 102. The sensor system 260 may include other types of sensors such as a light sensor, a distance and/or proximity sensor, a contact sensor such as a capacitive sensor, a timer, and/or other sensors and/or different combination(s) of sensors. The sensor system 260 may be used to obtain information associated with a position 268 and/or orientation 270 of wearable device 102. For example, the sensor system 260 may receive and/or request information from mobile device 104 as a basis for determining the position 268 and orientation 270 of wearable device 102.

In some implementations, the wearable device 102 includes AR smart glasses and the mobile computing device may be any of a computing device such as a smartphone, a tablet, a laptop, or another wearable device such as a smart watch, earbuds/headphones, or smart earbuds/headphones., etc. The wearable device 102 may be connected to the mobile device via a wireless connection such as a short-range connection (e.g., Bluetooth connection or near-field communication (NFC) connection) or an Internet connection (e.g., Wi-Fi or mobile network).

In operation, the wearable device 102 may determine a pose and/or position 268 based on an onboard camera 272 or image sensor 262. In some implementations, the position includes a 3-DoF position 274 of the wearable device 102 determined using IMU 264, for example. In some implementations, the position 268 includes a 6-DoF position 276 of the wearable device 102 that is determined based on information received via mobile device 104 and based on orientation 270. For example, a map application programming interface (API) of the mobile device 104 may be accessed to obtain a precise altitude of the mobile device 104. This altitude may represent an altitude determined using the GPS 229. In some implementations, the altitude may instead be obtained using the VPS 212 of the mobile device 104, which may access an onboard camera system, vision system, and/or image sensor on the mobile device 104. The obtained altitude measurements may be communicated to the wearable device 102. The wearable device 102 utilizes the altitude measurements and the position (e.g., latitude and longitude) to figure out the position and altitude of the wearable device 102 in the world space.

To obtain an orientation of the mobile device 104 in world space, the system 200 may request the orientation measurement from the VPS 212 of the mobile device 104. The orientation obtained from the VPS 212 of the mobile device 104 may be communicated to the wearable device 102. The wearable device 102 may then continue to track its rotation and orientation in world space using the onboard IMU 264 of the wearable device 102 based on the initial position and orientation obtained from (e.g., communicated from) the mobile device 104. In particular, the position is based on the initially received latitude and longitude positions from the GPS 229 of the mobile device 104. The rotation and orientation is based on the initially received altitude and position from the VPS 212 of the mobile device 104. Thus, using VPS 212 and GPS 229 of the mobile device 104 in combination with the IMU 264 of the wearable device 102, the wearable device 102 may begin to track itself in 6-DoF in world space in order to provide a navigation experience with instructions, directions, and/or other visual content on a display 258 of the wearable device 102.

In some implementations, coordinate systems may be converted between the mobile device 104 and the wearable device 102. Coordinate conversion module 277 may be configured to retrieve particular device coordinates to real-world (e.g., world space) coordinates and/or coordinates that are relevant to an orientation of another device. For example, the coordinate conversion module 277 can convert coordinate systems from a local device coordinate space to a real-world coordinate space. In some implementations, the coordinate conversion module 277 can convert coordinates from a real-world coordinate space to a local device coordinate space. In some implementations, the coordinate conversion module 277 may additionally move, rotate, and/or scale a particular transformation from one space into another space.

The wearable device 102 also includes control system 278 including various control system devices to facilitate operation of the wearable device 102. The control system 278 may utilize processors 250, sensor system 260, and/or processors 280 (e.g., CPUs, GPUS, DSPs, and the like) operably coupled to the components of the wearable device 102.

The wearable device 102 includes a UI renderer 282. The UI renderer 282 may function with the display 258 to depict user interface objects or other content to the user of the wearable device 102. For example, the UI renderer 282 may receive determined positions and/or orientations of the device 102 to generate and render user interface content on the display 258.

The wearable device 102 also includes a communication module 284. The communication module 284 may enable the wearable device 102 to communicate to exchange information with another computing device within range of the device 102. For example, the wearable device 102 may be operably coupled to another computing device, to facilitate communication via, for example, a wired connection, a wireless connection via for example, Wi-Fi or Bluetooth, or other type of connection.

In some implementations, the wearable device 102 is configured to communicate with the server computer 202 and/or the mobile device 104 over the network 236. The server computer 202 may represent one or more computing devices that take the form of a number of different devices, for example a standard server, a group of such servers, or a rack server system. In some implementations, the server computer 202 is a single system sharing components such as processors and memories. The network 236 may include the Internet and/or other types of data networks, such as a local area network (LAN), a wide area network (WAN), a cellular network, satellite network, or other types of data networks. The network 236 may also include any number of computing devices (e.g., computer, servers, routers, network switches, etc.) that are configured to receive and/or transmit data within network 236.

Although FIGS. 2A-2B illustrate a single wearable device 102, the implementations described herein may encompass any number of such systems (e.g., more than two). Although FIGS. 1A-1C illustrates fewer device elements than the systems depicted in FIGS. 2A-2B, the devices depicted in FIGS. 1A-1C may include (or have access to) any or all of the elements of the system 200 of FIGS. 2A-2B.

Figure 3A:
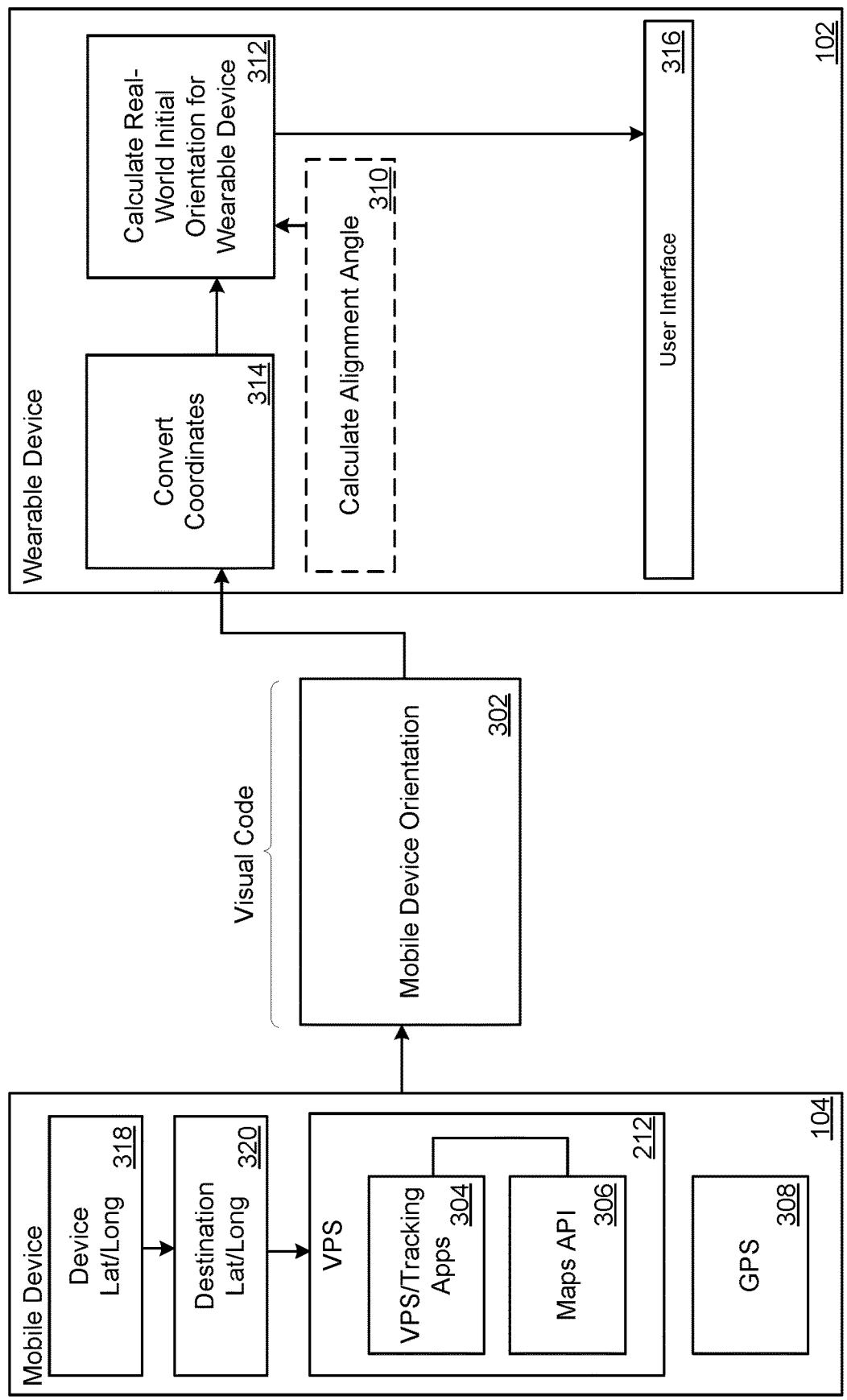
FIGS. 3A-3B illustrate logical flows between a mobile device and a wearable device in order to orient and track the wearable device in a physical environment and/or an AR environment, according to implementations described throughout this disclosure.

FIG. 3A illustrates an example logical flow between a mobile device and a wearable (e.g., computing, electronic) device to synchronize the orientation of the wearable (e.g., computing, electronic) device to the mobile device in a physical environment and/or an AR environment. For example, a user may be wearing the wearable device 102 (e.g., AR glasses, a controller, a smart watch, or the like) and may be within a threshold distance of the mobile device 104. The threshold distance may allow a short range wireless connection between the two devices such that the devices 102, 104 may utilize sensor data to enable tracking, location determinations, and/or other data communication and/or synchronization to provide the wearable device 102 with additional functionality than the available functionality without the short range wireless connection to device 104 (or another device).

In some implementations, the mobile device 104 may share information with wearable device 102. For example, the mobile device 104 may share sensor data and utilize interaction patterns between the wearable device 102 and the mobile device 104. In particular, a VPS in the mobile device may be used with a gyroscope (or IMU) and camera in the wearable device 102 to synchronize the two devices 102, 104 which may allow sharing a precise orientation from the mobile device 104 to the wearable device 102 when the wearable device 102 may not otherwise have enough sensors, hardware, battery power, etc. to obtain such a precise orientation at a point in time.

In some implementations, the mobile device 104 may share information with wearable device 102 using visual codes. For example, the mobile device 104 may obtain (e.g., measure, retrieve, etc.) sensor data and may embed the sensor data into a visual code 302 (e.g., similar to visual code 108A). To generate the information for the visual code 302, the mobile device 104 may detect its own orientation using the visual positioning system 212 and/or various other sensors or software applications such as tracking apps 304 and/or maps Application Programming Interface (API) 306, and/or GPS sensor 308.

The generated visual code 302 may then be displayed on the mobile device 104. An image sensor (e.g., camera device) on another device (e.g., the wearable device 102) may then scan/read the visual code. In the example of FIG. 3A, the visual code 302 has embedded at least an orientation of the mobile device 104. This orientation represents a real-world orientation of the mobile device in a physical space. The orientation in code 302 may be obtained from the VPS/Tracking Apps 304 and/or in combination with the IMU sensor 208 of device 104. Other information may also be embedded in the visual code 302, as described throughout this disclosure.

To trigger the wearable device 102 to read the visual code 302 being displayed on the mobile device 104, the wearable device 102 may receive a prompt to move the mobile device 104 (e.g., or other electronic device displaying the visual code 302 into a field of view (e.g., line of sight) of an image sensor onboard the wearable device 102. A user wearing the wearable device 102 may then bring the mobile device 104 into the field of view or line of sight of the wearable device 102.

In response to detecting that a visual code (e.g., visual code 302) displayed on the mobile device 104, for example, is within the line of sight of the image sensor of the wearable device 102, the wearable device 102 may scan the visual code 302 using the image sensor or another code reader sensor or module. Scanning the visual code 302 may result in the wearable device 102 retrieving at least data representing the orientation of the mobile device 104 in three-dimensional space. For example, the wearable device 102 may read the visual code 302 to obtain the real-world orientation of the mobile device 104. The wearable device 102 may use this orientation at a later time to determine other locational and/or tracking data for the wearable device 102.

In general, the mobile device 104 orientation captured in visual code 302 represents a measured orientation from mobile device 104 sensor devices such as orientation and/or motion sensors (not shown) including, but not limited to one or more accelerometers, tilt sensors, gyroscopes, and the like. The orientation and/or motion sensor(s) may be utilized to detect real-world orientation and/or movement (e.g., rotations in one or more dimensions and/or translations in one or more dimensions) of the mobile device 104.

In addition to scanning the visual code 302, the wearable device may recognize that the visual code 302 is scanned in six degrees of freedom and thus, an angle of scan may be calculated. The angle of scan of the visual code 302 may be represented as an alignment angle 310 determined by the wearable device 102. The alignment angle 310 may represent a heading direction and a tilt from a known vertical direction based on a compass or other sensor of the wearable device 102, for example. The alignment angle 310 may enable the wearable device 102 to use its heading direction as an input to determine other viewing aspects, orientations, and/or wearable device directional/pose aspects.

For example, the alignment angle 310 may be used in combination with the scanned orientation represented in visual code 308 to generate for the wearable device 102, an initial orientation (e.g., shown by real-world initial orientation 312). In some implementations, the real-world orientation (e.g., initial orientation) of the wearable device 102 is based on the orientation retrieved from mobile device 104 via code 302, which may then be converted 314 to coordinates of the wearable device 102.

In some implementations, the determined initial orientation 312 for the wearable device 102 may be a real-world orientation of the device 102 relative to a coordinate system of a physical environment (e.g., environment 100A/100C). In some implementations, the determined initial orientation 312 for the wearable device 102 may be a real-world orientation of the device 102 relative to a coordinate system of an AR environment. Since the real-world orientation of device 102 may be calculated from a detected orientation of mobile device 104, the coordinate conversion module 277 may convert orientations from a first coordinate system to another coordinate system to ensure that particular metrics from a first device are usable with the metrics and/or sensor devices of another device.

The conversion of coordinates may enable a determination of a real-world representation of the orientation of the wearable device 102 so the device 102 can then continue to track (and/or position) the orientation of itself in the coordinate system of the wearable device 102, as the wearable device 102 moves in 3D space. The tracking may be based on the generated initial orientation and changes in orientation of the wearable device 102 as the wearable computing device moves in the three-dimensional space. In some implementations, the tracking is initially based on the orientation and/or position of the mobile device 104 because such metrics may be used to initially orient the wearable device 102.

In some implementations, augmented reality content corresponding to the tracking information may be depicted in the user interface 316 of the wearable device 102, as the wearable device 102 moves in the three-dimensional space. An IMU sensor of the wearable device may continue to determine the device 102 orientation, as the wearable device 102 moves in three-dimensional space. For example, as a body part (e.g., head, arm, leg, body, hand, etc.) wearing the wearable device 102 moves, the IMU of the wearable device 102 tracks how much the body part moves and recalculates the orientation.

In some implementations, the user interface 316 may be used to provide instructional or navigation content. For example, a user wearing the wearable device 102 may wish to be provided directions to a destination using the user interface 316 to display content on device 102 as the user walks to the destination. The user may synchronize and orient the wearable device 102 to a mobile device in proximity to the wearable device in order to utilize one or more sensors, software, and/or services available to the mobile device 104. In particular, the VPS/tracking apps 304 of the mobile device 104 may determine mobile device latitude and longitude in the world to obtain a device latitude and longitude position 318. In addition, the GPS sensor 308 of the mobile device 104 may determine a destination latitude and longitude position 320. Both position 318 and position 320 may be provided to wearable device 102 via visual code 302, for example, if mobile device 104 also embeds position 318 and position 320 in the visual code data of visual code 302.

The wearable device 102 may receive the position 318 and position 320 in addition to the orientation of the mobile device 104. The wearable device 102 may use the data by scanning the visual code 302. The mobile device 104 may then be removed from view of device 102 (e.g., stored in a bag, pocket, etc.) as the synchronization of data from the mobile device to the wearable device is completed. That is, the wearable device may not have to maintain a connection to the mobile device 104. The wearable device 102 may then convert 314 the retrieved data to a real-world coordinate system for the wearable device 102 and calculate the initial real-world orientation 312 for the wearable device 102.

The initial orientation of the wearable device 102 combined with the initial mobile device position 318 and destination position 320 may be used to generate navigation instructions from the user's current position and orientation to the destination. The user interface 316 may output AR content, objects, text, etc., to indicate instructions for the user to follow to navigate to the destination.

Figure 3B:
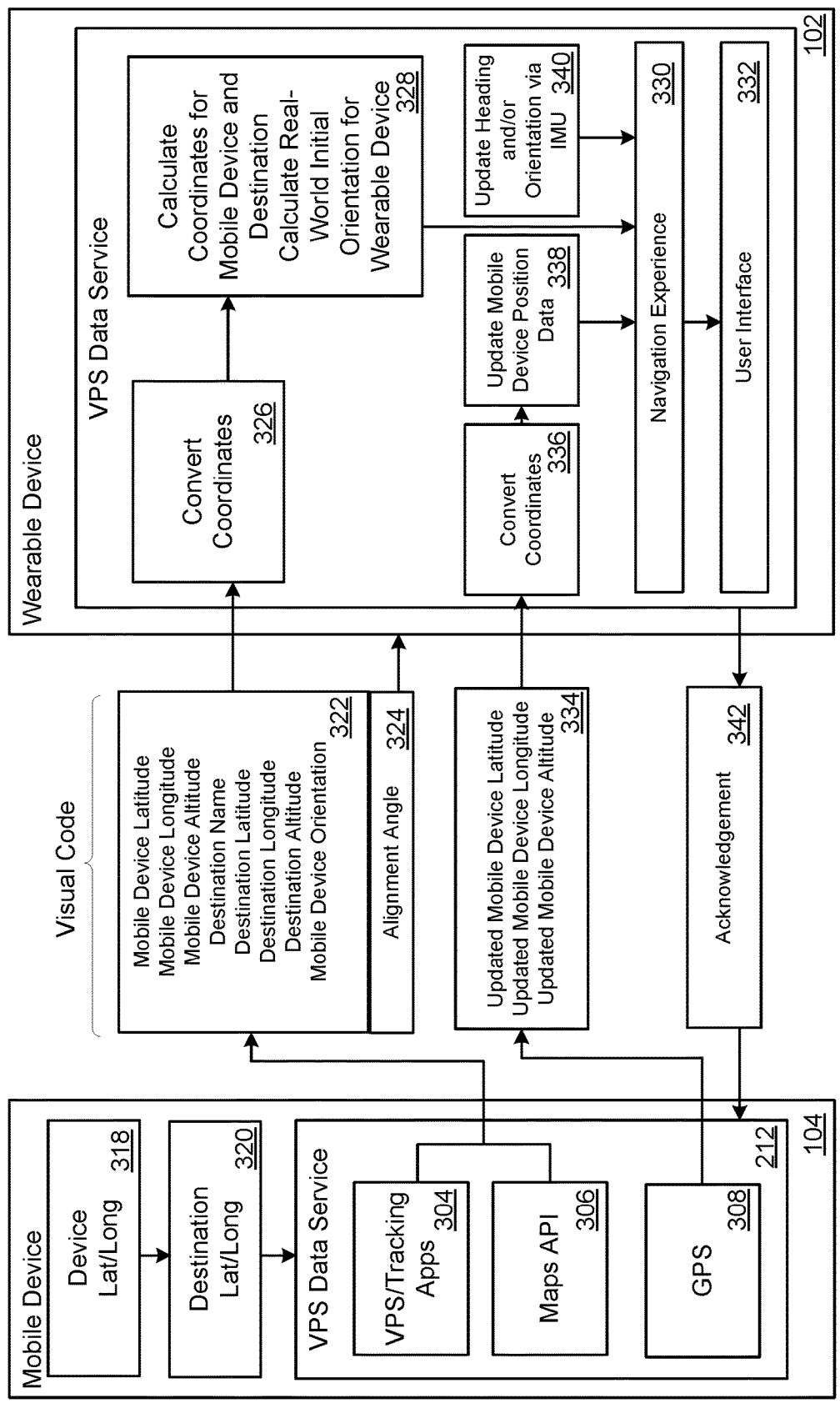

FIG. 3B illustrates a logical flow between a mobile device and a wearable device in order to track the wearable device in a physical environment and provide location-based information. In short, the wearable device 102 may use information from the mobile device 104 to track itself in 6-DoF and provide a navigation experience for a user wearing the wearable device 102. In particular, the logical flow of FIG. 3B may determine a latitude position and longitude position for a mobile device, determine altitude information for the mobile device, determine an orientation of the mobile device, and generate this information into a visual code for scanning by the wearable device 102. The wearable device 102 may use the information in the visual code to determine wearable device orientation, and tracking information in order to generate and utilize presented navigation instructions to a destination.

In some implementations, the visual code is not generated, but the information embedded in the code may instead be sent via wireless connection from the mobile device 104 to the wearable device 102. The information sent via wireless connection may then be used to determine wearable device orientation, and tracking information in order to generate and utilize presented navigation instructions to a destination. The wearable device 102 may use the received information from the mobile device 104 as an initial position and orientation to begin tracking the orientation of itself as the device 102 moves in space. In addition, the information received from the mobile device 104 may also be used by the wearable device 102 to track itself in 6-DoF.

In some implementations, the shared information from device 104 may be used to generate a 6-DoF tracking system for the wearable device 102 in an outdoor setting, for example. In operation, a user of wearable device 102 may trigger the logical flow of FIG. 3B by requesting navigation instructions (e.g., directions) to a destination. Rather than utilize the mobile device during the navigation to the destination, the user may configure the devices 102, 104 to share information in such a way that the user may put the mobile device 104 away after the configuration step and may then begin to receive navigation instructions via a display of the wearable device 102. In some implementations, the user may begin with a destination entered in an app on the mobile device 104 (via audio or touch input). In either example, the mobile device 104 may be communicably coupled to the wearable device over a wireless connection in order to share data. In some implementations, the communicable coupling of the wearable device 102 to the mobile device 104 is triggered based on a location-based (navigation) request and/or receiving, at the wearable device 102 (from the mobile device 104), an invitation to communicably couple over the wireless connection.

If the user enters a request in an app (e.g., a mapping app), the mobile device 104 may trigger the VPS 212 to determine the device latitude and longitude position 318 and/or the destination latitude and longitude position 320. The VPS may utilize any of the VPS/Tracking Apps 304, the Maps API 306, and/or the GPS sensor 308 to obtain position 318 and/or position 320.

For example, the GPS sensor 308 may request, via a GPS service, the latitude and longitude position 318 for the device 104. The Maps API 306, for example, may request, using the VPS data service 212, for example, the destination latitude and longitude position 320. The obtained latitude and longitude position 318 of device 104 and position 320 may be sent via wireless connect (e.g., Bluetooth or other short range wireless connection) to the wearable device 102. In some implementations, the mobile device 104 may alternatively generate a visual code 322 (e.g., similar to visual code 108A, 302) rather than directly send data from the mobile device 104.

If the visual code 322 is utilized, the code 322 may include embedded data such as a mobile device 104 latitude, a mobile device 104 longitude, a mobile device 104 altitude, a destination name, a destination latitude, a destination longitude, a destination altitude, and/or a mobile device 104 orientation. In some implementations, before the capture of the visual code by a camera/image sensor of the wearable device 102, the visual code may also include a calculated alignment angle 324 (similar to alignment angle 310). In some implementations, the visual code 322 may also provide the wearable device 102 with the mobile device 104 facing direction (e.g. North, South, West, East, etc.).

Upon generating the information described with respect to the visual code 322 above, the mobile device 104 may transmit (via wireless or via scan of code 322) the data of visual code 322 (and/or alignment angle 324) to wearable device 102, where the mobile device and destination coordinates are converted 326 for use in the wearable device. In addition, based on the converted coordinates, the wearable device may determine coordinates for the mobile device 104 position and the destination position as well as determine the real-world initial orientation 328 of the wearable device.

Using the obtained information from the mobile device 104 and the determined real-world initial orientation 328 of the wearable device 102, the wearable device 102 may generate a navigation experience 330 with directions to the destination. The navigation experience 330 may be provided via audio and/or user interface 332. The content depicted in user interface 332 may include turn-by-turn directions, one or more maps, indicators depicted as the device 102 moves in space, or other instructions or directional content to assist the user in navigating to the destination. In one example, FIG. 1C depicts arrows 144, 146, and 140B as an example of a portion of a navigation experience. Such arrows are provided in display 106, as shown by example arrow 140A.

The wearable device 102 may continue to utilize sensor data from the mobile device 104. For example, as the mobile device 104 and the wearable device 102 are moved in space, the GPS sensor 308 of the mobile device 104 may obtain updated mobile device coordinates. For example, the GPS sensor 308 may obtain and transmit 334 updated mobile device latitude and longitude positions as well as updated mobile device 104 altitude. The updated information may be passed from mobile device 104 upon detecting movement, on a predefined schedule, and/or upon request from the wearable device 102. When the wearable device 102 receives the updated information (e.g., via transmission 334), the device 102 may convert 336 the coordinates into real-world coordinates and in turn may then update 338 the mobile device position data used at device 102 to recalculate 340 an updated heading and/or orientation for the wearable device 102 because the device 102 was moved in space.

The updated mobile device 104 position data and the updated heading and/or orientation data may be used to update the navigation experience 330. The updated navigation experience may be provided on the user interface 332 of the wearable device 102. The user may then view the updated content and follow the instructions to continue toward the destination.

At any point during interactions between the mobile device 104 and the wearable device 102, the wearable device 102 may generate acknowledgement data 342 to trigger the mobile device 104 to stop using one or more services or actions. For example, the wearable device may trigger acknowledgement data 342 to stop displaying the visual code on the device 104 because the device 102 has retrieved the data. In another example, the wearable device may trigger acknowledgement data 342 to disengage from receiving updated mobile device position data, which may disengage GPS sensor 308, maps API 306, and/or VPS/tracking apps 304. Such an acknowledgement may occur, for example, if the user reaches the destination and no longer wishes to receive updated instructions based on the updated mobile device 104 position data.

Figure 4A:
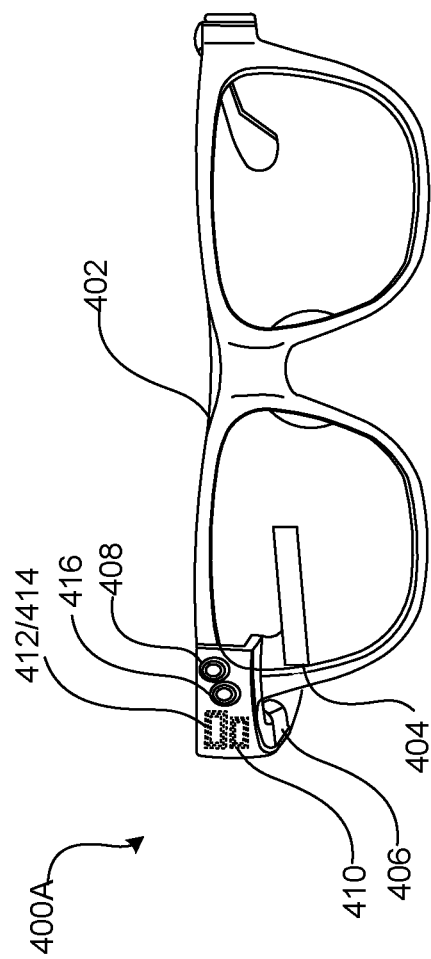
FIGS. 4A-4B illustrate an example of an electronic wearable device, according to implementations described throughout this disclosure.
Figure 4B:
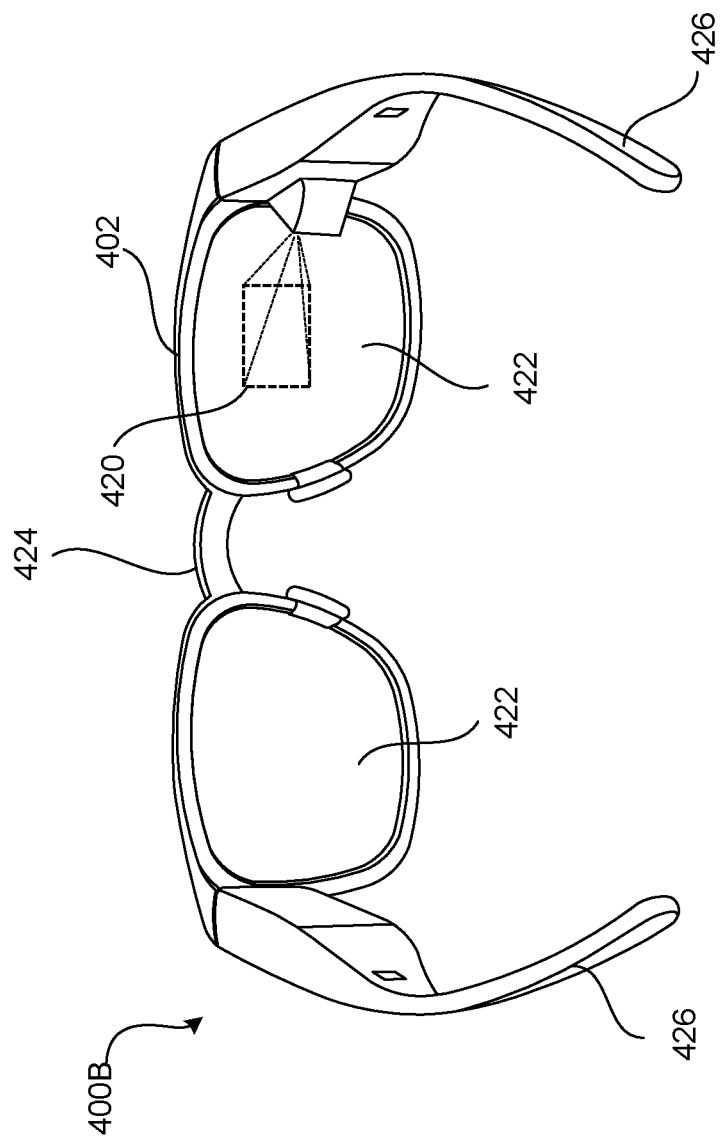

FIGS. 4A-4B illustrate various views of an example of an AR wearable device, according to implementations described throughout this disclosure. FIG. 4A is a front view of an example of a wearable device, according to implementations described throughout this disclosure. In this example, the wearable device is a pair of electronic AR glasses 400A (e.g., wearable device 102 in FIG. 1A). In general, the AR glasses 400A may include any or all components of device 102. AR glasses 400A may also be indicated as smart glasses representing an optical head-mounted display device designed in the shape of a pair of eyeglasses. For example, smart glasses are glasses that add information (e.g., project a display) alongside what the wearer views through the glasses.

Although AR glasses 400A are shown as an electronic wearable device described herein, other types of wearable devices are possible. For example, the wearable device may include a head-mounted display (HMD) device such as an optical head-mounted display (OHMD) device, a transparent heads-up display (HUD) device, an augmented reality (AR) device, or other devices such as goggles or headsets having sensors, display, and computing capabilities. In some examples, the wearable device may be a watch, a mobile device, a piece of jewelry, a ring controller, or other wearable controller.

As shown in FIG. 4A, the AR glasses 400A include a frame 402, with a display device 404 coupled in the frame 402 (or in the glass portion of frame 402). The AR glasses 400A also include an audio output device 406, an illumination device 408, a sensing system 410, a control system 412, at least one processor 414, and a camera 416.

The display device 404 may include a see-through near-eye display such as those using birdbath or waveguide optics. For example, such an optical design may project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world next to digital images (e.g., user interface elements, virtual content, etc.) generated by the display device 404. In some implementations, waveguide optics may be used to depict content on display device 404 of AR glasses 400A.

The audio output device 406 (e.g., one or more speakers) may be coupled to the frame 402. The sensing system 410 may include various sensing devices and the control system 412 including various control system devices to facilitate operation of the AR glasses 400A. The control system 412 may include one or more processors 414 operably coupled to the components of the control system 412.

The camera 416 may be capable of capturing still and/or moving images. In some implementations, the camera 416 may be a depth camera that can collect data related to distances of external objects from the camera 416. In some implementations, the camera 416, may be a point tracking camera that can, for example, detect and follow one or more optical visual codes on an external device, such as, for example, optical tracking markers (e.g., QR codes, barcodes, etc.) on an input device or finger on a screen. In some implementations, the AR glasses 400A may include an illumination device 408 that may selectively operate, for example, with the camera 416, for detection of objects (e.g., virtual and physical) in the field of view of the camera 416. The illumination device 408 may selectively operate, for example, with the camera 416, for detection of objects in the field of view of the camera 416.

AR glasses 400A may include a communication module (e.g., communication module 284) in communication with processor 414 and control system 412. The communication module may provide for communications between devices housed within AR glasses 400A as well as communication with external devices, such as, for example, controllers, mobile devices, and/or other computing devices. The communication module may enable the AR glasses 400A to communicate to exchange information with another computing device within range of the AR glasses 400A. For example, the AR glasses 400A may be operably coupled to the mobile device 104 to facilitate communication via, for example, a wired connection, a wireless connection via for example, Wi-Fi or Bluetooth, or other type of connection.

FIG. 4B is a rear view 400B of the AR glasses 400A, according to implementations described throughout this disclosure. The AR glasses 400B may be an example of the wearable device 102 of FIGS. 1A-1C, 2A-2B, and 3A-3B. The AR glasses 400B are glasses that add information (e.g., project a display 420) alongside what the wearer views through the glasses. In some examples, instead of projecting information, the display 420 is an in-lens micro display. In some examples, AR glasses 400B (e.g., eyeglasses or spectacles), are prescription or non-prescription vision aids, including lenses 422 (e.g., glass or hard plastic lenses) mounted in the frame 402 that holds them in front of a person's eyes, typically utilizing a bridge 424 over the nose, and bows 426 (e.g., temples or temple pieces) which rest over the ears.

Figure 5:
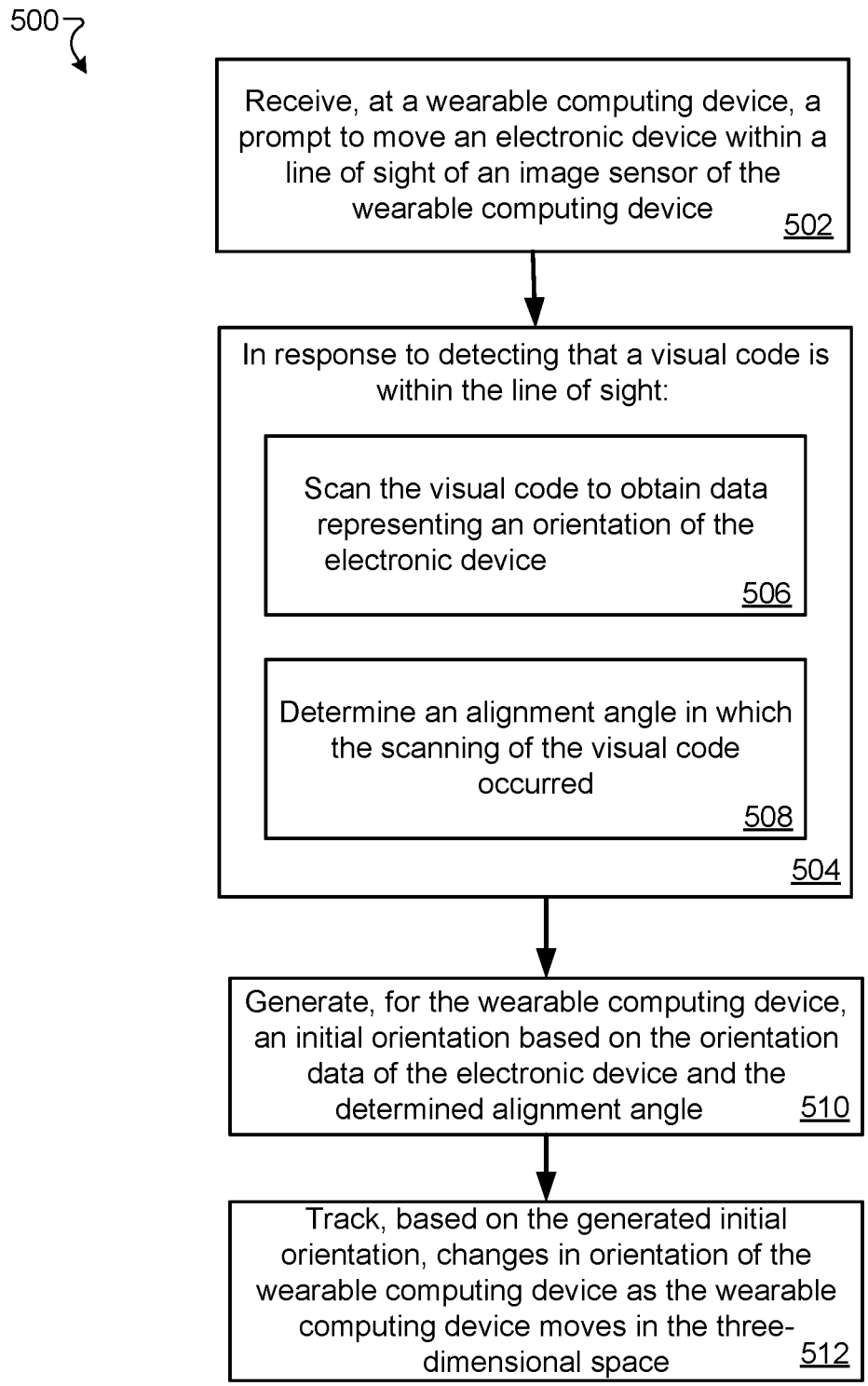
FIG. 5 is a flow chart diagramming an example of a process to orient and track a wearable device, according to implementations described throughout this disclosure.

FIG. 5 is a flow chart diagramming an example of a process 400 to orient and track a wearable device, according to implementations described throughout this disclosure. In general, process 500 utilizes the systems and algorithms described herein to enable a wearable device (e.g., a wearable computing device such as AR glasses) to scan a visual code on a separate electronic device (e.g., a mobile phone device) in order to share sensor data from the mobile device with the wearable device. The shared sensor data may be used by the systems and methods described herein to synchronize, orient, and track the wearable device in 6-DoF.

The process 500 may utilize a computing system with at least one processing device and memory storing instructions that when executed cause the processing device to perform the plurality of operations and computer implemented steps described in the claims.

At block 502, the process 500 includes receiving, at a wearable computing device, a prompt to move an electronic device within a line of sight of an image sensor of the wearable computing device. In this example, the wearable computing device may be the wearable device 102 and the electronic device may be the mobile device 104. For example, device 102 may include electronic eyeglasses while mobile device 104 includes a smart phone configured to assist with tracking movements of the wearable computing device (e.g., electronic eyeglasses).

In operation, a user of the wearable device 102 may wish to synchronize and/or orient the wearable device 102 to the user's mobile device 104. To do so, the user may configure the wearable device 102 to synchronize and/or orient by opening an app or setting to do so. The wearable device 102 may then trigger display of the prompt to align the mobile device 104 to be viewed from an image sensor on the wearable device 102.

At block 504, the process 500 includes detecting that a visual code displayed on the electronic device is within the line of sight of the image sensor of the wearable computing device. For example, the wearable device 102 may detect that the visual code 302 is within the line of sight (e.g., field of view) of an onboard image sensor 262 and/or camera 272.

In response to detecting that the visual code 302 displayed on the electronic device (mobile device 104) is within the line of sight of the image sensor of the wearable computing device (e.g., wearable device 102), the process 500 may include, at block 506, scanning the visual code with the image sensor. The scanning may result in retrieving at least data (e.g., via visual code 122/230, visual positioning data 226, etc.) representing an orientation of the electronic device (e.g., mobile device 104) in three-dimensional space. In addition, responsive to the detecting of the visual code being in the line of sight of the image sensor of the wearable device, the process 500 may also include determining an alignment angle in which the scanning of the visual code occurred. For example, the wearable device 102 may determine the alignment angle 132 (FIG. 1B) upon scanning/reading the visual code (e.g., visual code 122/230). The alignment angle 132 represents a heading direction and tilt from a perpendicular to the mobile device 104 display, at which the visual code 122/230, presented on the device 104, is scanned by the image sensor or camera of the wearable device 102. In some implementations, the alignment angle may represent an angle of view associated with the wearable device 102.

At block 510, the process 500 includes generating, for the wearable computing device, an initial orientation based on the orientation data of the electronic device and the determined alignment angle. For example, the wearable device 102 may generate its initial orientation 270 based on the received orientation data (received via visual code 122/230) and on the determined alignment angle 132.

At block 512, the process 500 includes tracking, based on the generated initial orientation 270, changes in orientation of the wearable computing device as the wearable computing device moves in the three-dimensional space. For example, the wearable device may track itself based on the determined initial orientation 270 and any changes in orientation as the device 102 moves in space. For example, the tracking of the changes in the orientation of the wearable device 102 may be performed using an IMU of the device 102.

In some implementations, the scanning of the visual code additionally results in obtaining, by the wearable computing device, data representing an initial position of the electronic device in three-dimensional space. For example, the wearable device 102 may also scan the visual codes described herein to obtain initial position data stored in the visual code 122/230. In some implementations, after the initial scan of the visual code 122/230, the mobile device 104 may continue to send position data over a wireless connection connecting device 102 and device 104. Thus, the tracking may then be further based on the changes in orientation of the wearable device 102 and the updated positions of the mobile device 104 wirelessly received at the wearable device 102. The received updated positions may result in triggering continuous tracking of the wearable device 102 with six degrees of freedom as the wearable device 102 is moved in the three-dimensional space.

Figure 6:
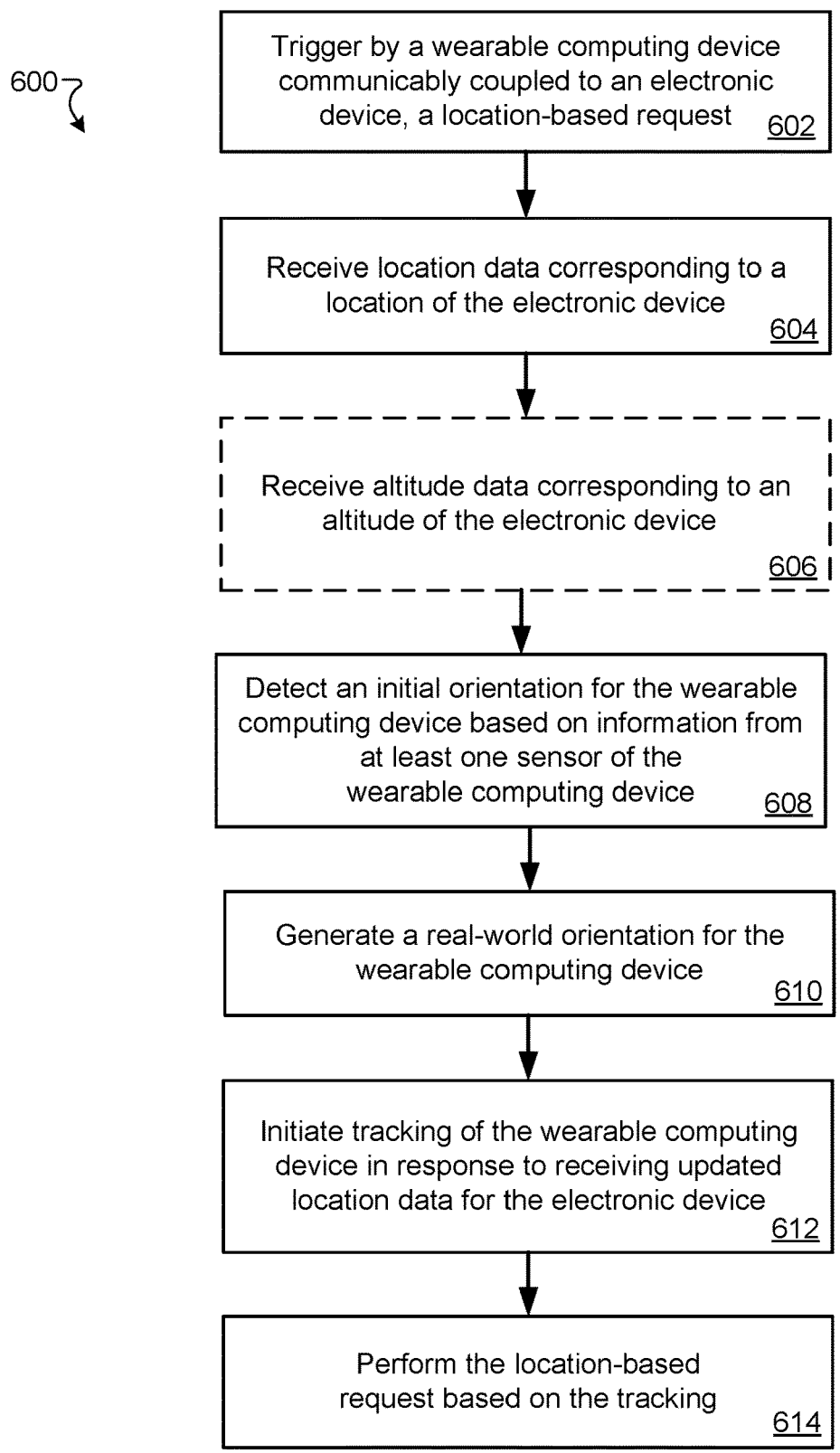
FIG. 6 is a flow chart diagramming an example of a process to perform tracking for a wearable device based on a position and orientation of an electronic device, according to implementations described throughout this disclosure.

FIG. 6 is a flow chart diagramming an example of a process 600 to perform tracking and location-based requests for a wearable device based on a position and orientation of an electronic device, according to implementations described throughout this disclosure.

In some implementations, the wearable computing device is a pair of electronic eyeglasses (e.g., AR glasses, wearable device 102, or the like) configured with a near eye display device (e.g., display 106) to present augmented reality information and/or other images captured by a camera of the device 102. In some implementations, the electronic device is a smart phone or smart watch (e.g., mobile device 104 or the like).

In general, process 600 utilizes the systems and algorithms described herein to enable the wearable device 102 (e.g., a wearable computing device such as AR glasses) to utilize sensor data from the mobile device 104 (e.g., a smartphone, smartwatch, etc.) with the wearable device 102. For example, the techniques described herein may share sensor data with the wearable device 102 by accessing a visual positional system of the mobile device 104 to carry out location-based and tracking-based tasks. In some implementations, the wearable device 102 can use the accessed data to determine its own orientation, location, and/or tracking data.

For example, sensor data retrieved from the mobile device 104 may be used by the wearable device 102 to perform tracking of the wearable device 102 in order to carry out a location-based request. The location-based request may include any or all of a request for generating navigation instructions to a destination, a request for destination information, a request for turn-by-turn navigation instructions, a request for one or more maps, a request for travel tips, and/or other location-based or destination-based request to discover information.

The process 600 may utilize a computing system with at least one processing device and memory storing instructions that when executed cause the processing device to perform the plurality of operations and computer implemented steps described in the claims.

At block 602, the process 600 includes triggering, by a wearable computing device communicably coupled to an electronic device (e.g., mobile device 104 such as a smart phone), a location-based request. For example, a user wearing the wearable computing device (e.g., wearable device 102 such as electronic eyeglasses) may trigger a location-based request audibly to the wearable device 102. In some implementations, the location-based request may be provided as input at the mobile device 104 and the wearable device 102 may trigger the location-based request upon connecting (i.e., communicably coupling) to the mobile device 104. The connecting may generate a visual code to provide data from the mobile device 104 to the wearable device 102. The connecting may instead provide the data via wireless communication from the mobile device 104 to the wearable device 102.

In some implementations, the communicable coupling of the wearable device 102 to the mobile device 104 is triggered based on the triggered location-based request. In some implementations, the communicable coupling of the wearable device 102 to the mobile device 104 is triggered based on receiving, at the wearable device 102 and from the mobile device 104, an invitation to communicably couple over a wireless connection.

At block 604, the process 600 includes receiving location data corresponding to a location of the electronic device. For example, the wearable device 102 may receive position data corresponding to a location in space of the mobile device 104. The position data may include latitude and longitude (position) data corresponding to the location of the mobile device 104. The latitude and longitude (position) data being obtained from at least one device installed in the mobile device 104. For example, the latitude and longitude (position) data may be retrieved from the GPS sensor 229 or 308, the VPS 212 utilizing image sensor 206, or other onboard sensor capable of determining or retrieving latitude and longitude positions. For example, the location may be obtained by the mobile device 104 using the VPS 212 to determine the device 104 latitude and longitude position 318. The VPS may utilize any of the VPS/Tracking Apps 304, the Maps API 306, and/or the GPS sensor 308 to obtain position 318. In another example, the GPS sensor 308 may request, via a GPS service, the latitude and longitude position 318 for the device 104. In yet another example, the Maps API 306 may request using the VPS data service 212, the device latitude and longitude position 318. The location data obtained by the mobile device 104 may be provided via wireless connection or visual code to be received by the wearable device 102.

At block 606, the process 600 includes receiving altitude data corresponding to an altitude of the electronic device. For example, the mobile device 104 may obtain altitude data for itself using at least one application programming interface accessed by the electronic device. For example, the mobile device 104 may utilize GPS sensor 229/308 or other sensor or software program (e.g., barometers, compass, apps, widgets, altimeters, and the like) onboard device 104. The obtained latitude represents a vertical measurement measured from sea level. The altitude data obtained by the mobile device 104 may be provided via wireless connection or visual code to be received by the wearable device 102.

In some implementations, block 606 may be options. For example, receiving altitude data may be an optional step in process 600. For example, altitude data of the electronic device (e.g., the mobile device 102) may be instead obtained (received, retrieved) as part of the location data. In such an example, a location-based request may include a request for generating navigation instructions to a destination and the location data may include at least altitude data and latitude and longitude position data corresponding to a location of the electronic device (e.g., the mobile device 102) without having to separately obtain the altitude data.

At block 608, the process 600 includes detecting an initial orientation for the wearable computing device based on information from at least one sensor of the wearable computing device. For example, the wearable device 102 may detect the intimal orientation based on an onboard sensor such as an IMU 264 installed in device 102. The initial orientation of the wearable device 102 represents a particular rotation of the wearable device 102 in space. The determined initial orientation may be a portion of data used to generate a real-world orientation of the wearable device 102.

At block 610, the process 600 includes generating, based on the initial orientation of the wearable computing device and location data of the electronic device, a real-world orientation for the wearable computing device. For example, the wearable device 102 may generate the real-world orientation of itself based at least in part on data retrieved from a visual position service accessed by the electronic device (e.g., mobile device 104) and based on the initial orientation captured by the IMU 264. That is the mobile device 104 obtained position data, such as latitude, longitude, altitude, etc. and provided the data to the wearable device 102 to allow the wearable device 102 to take advantage of positional similarities of being proximate to other devices (e.g., the mobile device 104).

At block 612, the process 600 includes initiating tracking of the wearable computing device with six degrees of freedom in response to receiving updated location data for the electronic device. For example, if the wearable device 102 receives updated location data about the mobile device 104, for example, as the mobile device 104 moves (e.g., because the user moves), the updated location data receipt at the wearable device 102 may trigger wearable device 102 tracking to commence. The trigger may ensure that the wearable device 102 receives updated position data to continue lightweight computations on device 102 by receiving position data for device 104, which includes heavier weighted computations. Thus, the tracking of the wearable device 102 may be based on the updated location data and on detected changes in the information from the at least one sensor (e.g., detected changes of the onboard IMU of the wearable device 102). Thus, the updated position(s) can be utilized from the mobile device 104 on the wearable device 102 and the wearable device 102 can use the updated position(s) and/or the IMU data to determine the real-world orientation of the wearable device 102.

Combining this obtained data may result in an ability of the wearable device 102 to track itself in 6-DoF without having the typical onboard sensors to do so. For example, the electronic device may be a smart phone (e.g., mobile device 104, tablet, another wearable device, or the like) configured to obtain the location data and the updated location data to be provided to the wearable device 102 to assist with real time tracking movements of the wearable computing device in 6-DoF. In some implementations, receiving the updated location data triggers continuous tracking of the wearable computing device with six degrees of freedom as the wearable computing device is moved.

At block 614, the process 600 includes performing the location-based request based on the tracking. For example, if the location-based request is a request for generating navigation instructions to a destination, the wearable device 102 may generate the navigation instructions based on the received location data, the received updated location data, the received altitude data, and the generated real-world orientation. The navigation instructions may be configured to provide real time directions, according to the tracking, to navigate the wearable computing device to the destination.

In some implementations, the navigation instructions include AR content depicted as direction indicators (e.g., arrows 140A/B, 144, 146 or other symbols) to assist a user to navigate to the destination. The direction indicators may be depicted in a near eye display device of the wearable computing device, as shown in display 106 of FIG. 1C. In addition, the direction indicators may be updated in a user interface of the display 106, according to the tracking of the wearable device 102.

In some implementations, the navigation instructions include audio data and visual augmented reality content for display on a near eye display device of the wearable device 102. In some implementations, the wearable computing device is a pair of electronic eyeglasses (e.g., wearable device 102, configured with a near eye display device to present AR information and the electronic device is a smart phone (e.g., mobile device 104) configured to obtain the location data and the updated location data to be provided to the wearable device 102 to assist with tracking movements of the wearable device 102. In some implementations, the navigation instructions include only audio data in the event that the wearable device does not include a display capability.

Figure 7:
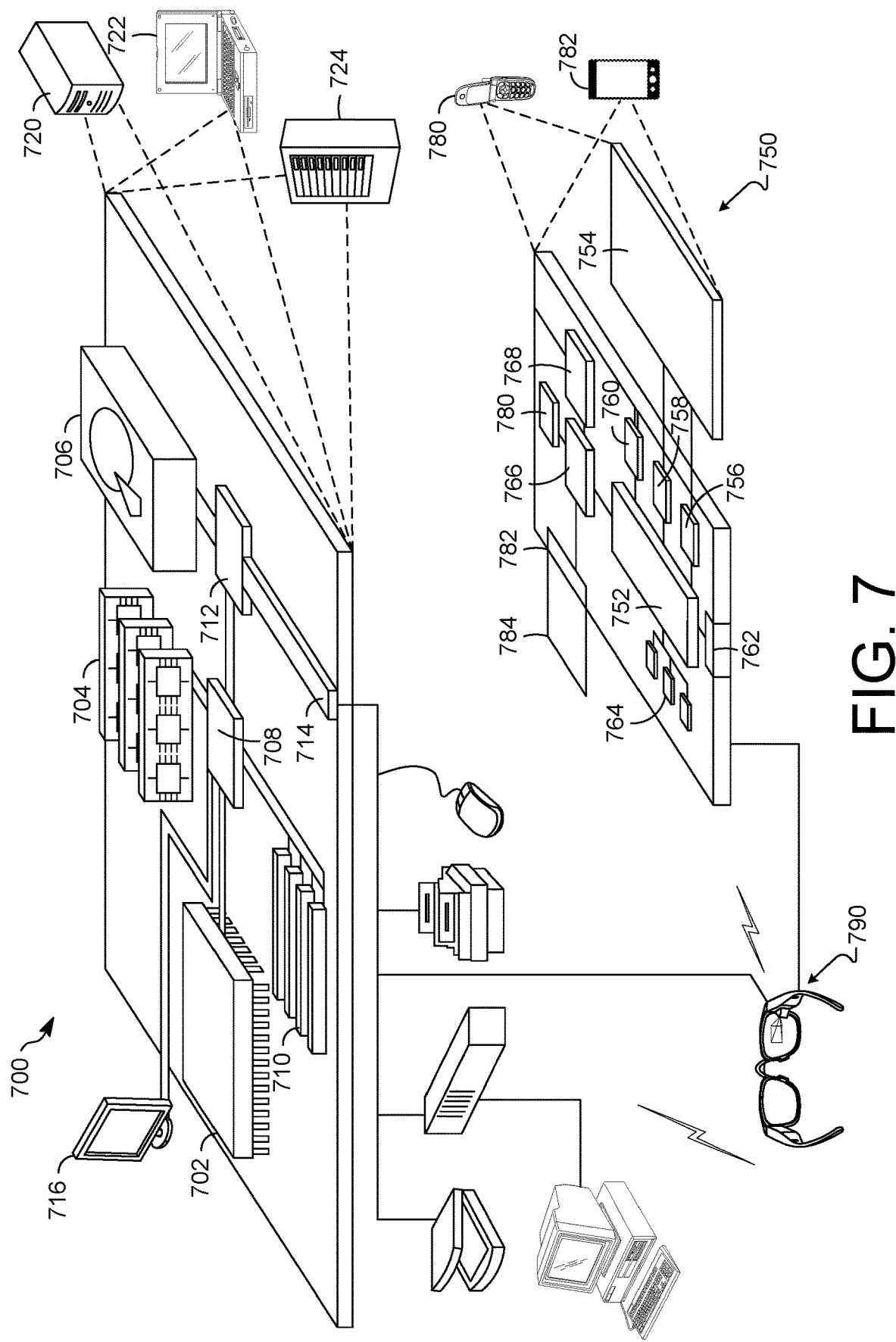
FIG. 7 shows an example of a computer device and a mobile computing device, which may be used with the techniques described herein.

FIG. 7 shows an example of a computer device 700 and a mobile computer device 750, which may be used with the techniques described here. Computing device 700 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In general, the computer-readable medium may be a non-transitory computer-readable medium.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, low power Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 7 can include sensors that interface with an AR/VR headset (AR glasses/eyeglasses/VR headset/AR headset/ HMD device 790). For example, one or more sensors included on computing device 750 or other computing device depicted in FIG. 7, can provide input to AR/VR headset 790 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 750 can use the sensors to determine an absolute position and/or a detected rotation of the computing device in the AR/VR space that can then be used as input to the AR/VR space. For example, computing device 750 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 750 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR/VR space can cause a particular action to occur in the AR/VR space.

In some embodiments, one or more output devices included on the computing device 750 can provide output and/or feedback to a user of the AR/VR headset 790 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 750 can be placed within AR/VR headset 790 to create an AR/VR system. AR/VR headset 790 can include one or more positioning elements that allow for the placement of computing device 750, such as smart phone 782, in the appropriate position within AR/VR headset 790. In such embodiments, the display of smart phone 782 can render stereoscopic images representing the AR/VR space or virtual environment.

In some embodiments, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR/VR space. As just one example, computing device can be a laser pointer. In such an example, computing device 750 appears as a virtual laser pointer in the computer-generated, 3D environment. As the user manipulates computing device 750, the user in the AR/VR space sees movement of the laser pointer. The user receives feedback from interactions with the computing device 750 in the AR/VR environment on the computing device 750 or on the AR/VR headset 790.

In some embodiments, a computing device 750 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method comprising:

triggering, by a wearable computing device communicably coupled to an electronic device, a location-based request;

receiving location data corresponding to a location of the electronic device;

detecting an initial orientation for the wearable computing device based on information from at least one sensor of the wearable computing device;

generating, based on the initial orientation of the wearable computing device and the location data of the electronic device, a real-world orientation for the wearable computing device;

initiating tracking of the wearable computing device with six degrees of freedom in response to receiving updated location data for the electronic device, the tracking of the wearable computing device being continuous and based on the updated location data and on detected changes in the information from the at least one sensor as the wearable computing device is moved; and performing the location-based request based on the tracking.

2. The computer-implemented method of claim 1, wherein the location-based request comprises a request for generating navigation instructions to a destination, the computer-implemented method further comprising:
  receiving altitude data corresponding to an altitude of the electronic device; and
  generating the navigation instructions based on the location data, the updated location data, the altitude data, and the generated real-world orientation, the navigation instructions being configured to provide real time directions, according to the tracking, to navigate the wearable computing device to the destination.

3. The computer-implemented method of claim 2, wherein:
  the navigation instructions include augmented reality content depicted as direction indicators to assist a user to navigate to the destination, the direction indicators being depicted in a near eye display device of the wearable computing device; and
  the direction indicators are updated according to the tracking.

4. The computer-implemented method of claim 2, wherein the navigation instructions include audio data and visual augmented reality content for display on a near eye display device of the wearable computing device.

5. The computer-implemented method of claim 1, wherein:
  the wearable computing device comprises electronic eyeglasses configured with a near eye display device to present augmented reality information; and
  the electronic device comprises a smart phone configured to obtain the location data and the updated location data to be provided to the wearable computing device to assist with tracking movements of the wearable computing device.

6. The computer-implemented method of claim 1, further comprising:
  receiving altitude data corresponding to an altitude of the electronic device,
  wherein the location data includes latitude and longitude position data corresponding to the location of the electronic device, the latitude and longitude position data being obtained from at least one device installed in the electronic device, and
  the altitude data is obtained from at least one application programming interface accessed by the electronic device.

7. The computer-implemented method of claim 1, wherein:
  the initial orientation is detected by the at least one sensor, the at least one sensor comprising an inertial measurement unit sensor installed in the wearable computing device; and
  the real-world orientation is generated based at least in part on data retrieved from a visual position service accessed by the electronic device.

8. The computer-implemented method of claim 1, wherein the communicable coupling of the wearable computing device to the electronic device is triggered based on:
  the triggered location-based request; and
  receiving, at the wearable computing device and from the electronic device, an invitation to communicably couple over a wireless connection.

9. The computer-implemented method of claim 1, further comprising:
  receiving altitude data corresponding to an altitude of the electronic device.

10. A computing system comprising:
  a wearable computing device including at least one sensor;
  at least one processing device; and
  a memory storing instructions that when executed cause the computing system to perform operations including:
    triggering, by the wearable computing device communicably coupled to an electronic device, a location-based request;
    receiving location data corresponding to a location of the electronic device;
    detecting an initial orientation for the wearable computing device based on information from the at least one sensor;
    generating, based on the initial orientation of the wearable computing device and the location data of the electronic device, a real-world orientation for the wearable computing device;
    initiating tracking of the wearable computing device with six degrees of freedom in response to receiving updated location data for the electronic device, the tracking of the wearable computing device being continuous and based on the updated location data and on detected changes in the information from the at least one sensor as the wearable computing device is moved; and
    performing the location-based request based on the tracking.

11. The computing system of claim 10, wherein the location-based request comprises a request for generating navigation instructions to a destination, and the operations further comprise:
  receiving altitude data corresponding to an altitude of the electronic device; and
  generating the navigation instructions based on the location data, the updated location data, the altitude data, and the generated real-world orientation, the navigation instructions being configured to provide real time directions, according to the tracking, to navigate the wearable computing device to the destination.

12. The computing system of claim 11, wherein:
  the navigation instructions include augmented reality content depicted as direction indicators to assist a user to navigate to the destination, the direction indicators being depicted in a near eye display device of the wearable computing device; and
  the direction indicators are updated according to the tracking.

13. The computing system of claim 10, further comprising:
  receiving altitude data corresponding to an altitude of the electronic device,
  wherein the wearable computing device comprises electronic eyeglasses configured with a near eye display device to present augmented reality information, and
  the electronic device comprises a smart phone configured to obtain the location data and the updated location data to be provided to the wearable computing device to assist with tracking movements of the wearable computing device.

14. The computing system of claim 10, further comprising:
  receiving altitude data corresponding to an altitude of the electronic device,
  wherein the location data includes latitude and longitude position data corresponding to the location of the electronic device, the latitude and longitude position data being obtained from at least one device installed in the electronic device, and the altitude data is obtained from at least one application programming interface accessed by the electronic device.

15. The computing system of claim 10, wherein the communicable coupling of the wearable computing device to the electronic device is triggered based on:

the triggered location-based request; and receiving, at the wearable computing device and from the electronic device, an invitation to communicably couple over a wireless connection.

16. A non-transitory, machine-readable medium having instructions stored thereon, the instructions, when executed by a processor, cause a computing device to perform:

receiving, at a wearable computing device and from an electronic device, an invitation to communicably couple over a wireless connection;

triggering, by the wearable computing device communicably coupled to the electronic device, a location-based request, the communicable coupling of the wearable computing device with the electronic device is triggered based on the location-based request;

receiving location data corresponding to a location of the electronic device;

detecting an initial orientation for the wearable computing device based on information from at least one sensor of the wearable computing device;

generating, based on the initial orientation of the wearable computing device and the location data of the electronic device, a real-world orientation for the wearable computing device;

initiating tracking of the wearable computing device with six degrees of freedom in response to receiving updated location data for the electronic device, the tracking of the wearable computing device being based on the updated location data and on detected changes in the information from the at least one sensor; and performing the location-based request based on the tracking.

17. The non-transitory, machine-readable medium of claim 16, wherein the location-based request comprises a request for generating navigation instructions to a destination and the location data includes at least altitude data and latitude and longitude position data corresponding to a location of the electronic device, and the instructions, when executed by the processor, cause the computing device to further perform:

generating the navigation instructions based on the location data, the updated location data, the altitude data, and the generated real-world orientation, the navigation instructions being configured to provide real time directions, according to the tracking, to navigate the wearable computing device to the destination.

18. The non-transitory, machine-readable medium of claim 17, wherein:

the navigation instructions include augmented reality content depicted as direction indicators to assist a user to navigate to the destination, the direction indicators being depicted in a near eye display device of the wearable computing device; and the direction indicators are updated according to the tracking.

19. The non-transitory, machine-readable medium of claim 16, wherein:

the wearable computing device comprises electronic eyeglasses configured with a near eye display device to present augmented reality information; and the electronic device comprises a smart phone configured to obtain the location data and the updated location data to be provided to the wearable computing device to assist with tracking movements of the wearable computing device.

20. A non-transitory, machine-readable medium having instructions stored thereon, the instructions, when executed by a processor, cause a computing device to perform:

triggering, by a wearable computing device communicably coupled to an electronic device, a location-based request;

receiving location data corresponding to a location of the electronic device;

detecting an initial orientation for the wearable computing device based on information from at least one sensor of the wearable computing device, the at least one sensor including an inertial measurement unit sensor installed in the wearable computing device; and generating, based on the initial orientation of the wearable computing device and location data of the electronic device, a real-world orientation for the wearable computing device, the real-world orientation being generated based at least in part on data retrieved from a visual position service accessed by the electronic device;

initiating tracking of the wearable computing device with six degrees of freedom in response to receiving updated location data for the electronic device, the tracking of the wearable computing device being based on the updated location data and on detected changes in the information from the at least one sensor; and performing the location-based request based on the tracking.

21. A computer-implemented method comprising:

receiving, at a wearable computing device, a prompt to move an electronic device within a line of sight of an image sensor of the wearable computing device;

in response to detecting that a visual code displayed on the electronic device is within the line of sight of the image sensor of the wearable computing device, scanning the visual code with the image sensor, the scanning resulting in retrieving at least orientation data representing an orientation of the electronic device in three-dimensional space, and determining, an alignment angle in which the scanning of the visual code occurred;

generating, for the wearable computing device, an initial orientation based on the orientation data of the electronic device and the determined alignment angle; and tracking, based on the generated initial orientation, changes in orientation of the wearable computing device as the wearable computing device moves in the three-dimensional space.

22. The computer-implemented method of claim 21, wherein:

the wearable computing device comprises electronic eyeglasses; and the electronic device is a smart phone configured to assist with tracking movements of the wearable computing device.

23. The computer-implemented method of claim 21, wherein the alignment angle represents a heading direction and tilt from a perpendicular to the electronic device display, at which the visual code, presented on the electronic device, is scanned by the image sensor of the wearable computing device.

24. The computer-implemented method of claim 21, wherein:
- the scanning of the visual code additionally results in obtaining, by the wearable computing device, data representing an initial position of the electronic device in three-dimensional space; and
- the tracking is further based on the changes in orientation of the wearable computing device and updated positions of the electronic device received at the wearable computing device, the received updated positions resulting in triggering continuous tracking of the wearable computing device with six degrees of freedom as the wearable computing device is moved in the three-dimensional space.

* * * * *